(12) United States Patent
Ardes

(10) Patent No.: US 9,403,107 B2
(45) Date of Patent: Aug. 2, 2016

(54) LIQUID FILTER HAVING A FILTER BYPASS VALVE AND FILTER INSERT THEREFOR

(75) Inventor: Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 631 days.

(21) Appl. No.: 13/995,796

(22) PCT Filed: Dec. 22, 2011

(86) PCT No.: PCT/EP2011/073769
§ 371 (c)(1),
(2), (4) Date: Jun. 19, 2013

(87) PCT Pub. No.: WO2012/085193
PCT Pub. Date: Jun. 28, 2012

(65) Prior Publication Data
US 2013/0270162 A1    Oct. 17, 2013

(30) Foreign Application Priority Data

Dec. 22, 2010 (DE) .......................... 10 2010 063 822

(51) Int. Cl.
*B01D 27/10* (2006.01)
*B01D 29/21* (2006.01)
*B01D 29/96* (2006.01)
*B01D 35/147* (2006.01)

(52) U.S. Cl.
CPC .............. *B01D 27/103* (2013.01); *B01D 29/21* (2013.01); *B01D 29/96* (2013.01); *B01D 35/147* (2013.01); *B01D 2201/0415* (2013.01); *B01D 2201/291* (2013.01); *B01D 2201/305* (2013.01); *B01D 2201/34* (2013.01); *B01D 2201/4007* (2013.01); *B01D 2201/4046* (2013.01); *B01D 2201/4053* (2013.01); *B01D 2201/4061* (2013.01); *B01D 2201/4084* (2013.01)

(58) Field of Classification Search
None
See application file for complete search history.

(56) References Cited

U.S. PATENT DOCUMENTS 9,266,044 B2 *  2/2016  van Savooijen ....... B01D 29/15
2001/0035376 A1  11/2001  Dworatzek
2011/0168613 A1   7/2011  van Savooijen et al.

FOREIGN PATENT DOCUMENTS

| DE | 20004431 | 6/2000 |
| DE | 29915843 | 1/2001 |
| DE | 102006050946 | 12/2007 |
| WO | 2009154445 | 12/2009 |

OTHER PUBLICATIONS

International Search Report, Mar. 13, 2012.

* cited by examiner

*Primary Examiner* — Terry Cecil
(74) *Attorney, Agent, or Firm* — Greer, Burns & Crain Ltd.

(57) ABSTRACT

Liquid filters comprising a housing having a removable cover, a liquid inlet, an outlet, a replaceable hollow cylindrical filter material insert, and a filter bypass valve comprising a valve seat arranged on the filter insert and a valve body that interacts with the valve seat and is biased in the closing direction. Two radially spaced closed sealing contours are provided between the valve seat and the valve body. At least one bypass channel, connecting the unfiltered and filtered side of the filter while bypassing the filter insert, passes through the valve seat between the sealing contours. The valve body is movably guided in the housing on a housing part, the two sealing contours are offset from each other in the axial direction, and the valve body has a corresponding conical or tapered or dome-like shape in the sealing area of the valve body that interacts with the sealing contours.

30 Claims, 31 Drawing Sheets

LIQUID FILTER HAVING A FILTER BYPASS VALVE AND FILTER INSERT THEREFOR

CROSS-REFERENCES TO RELATED APPLICATIONS

This application claims the benefit of the German patent application No. 10 2010 063 822.6 filed on Dec. 22, 2010, the entire disclosures of which are incorporated herein by way of reference.

BACKGROUND OF THE INVENTION

The invention relates to liquid filters, in particular oil filters or fuel filters for an internal combustion engine, comprising a housing having a removable cover, an inlet for liquid to be filtered which opens into an unfiltered side of the liquid filter, an outlet for filtered liquid which starts from a filtered side of the liquid filter, a replaceable filter insert, which separates the unfiltered side and the filtered side from one another and which comprises a hollow cylindrical filter material element enclosed at the end faces by two end discs, and a filter bypass valve, consisting of a valve seat arranged on the filter insert and a valve body which interacts with the valve seat and is acted upon by a preload force in the closing direction, wherein two closed sealing contours arranged one inside the other as viewed in the radial direction are provided between the valve seat and the valve body, and wherein at least one bypass channel, which connects the unfiltered side and the filtered side of the liquid filter while bypassing the filter material element, passes through the valve seat between the sealing contours. The invention further relates to a filter insert for such liquid filters.

A liquid filter of the aforementioned type is known from DE 200 04 431 U1. The known liquid filter has a housing structure in which the filter insert is installed. The housing structure may constitute a separate housing or may be an integral component for example of an internal combustion engine. The filter insert is of cylindrical construction, wherein the filter bypass valve is accommodated in the region of one of the end discs of the filter insert. To this end the valve seat is accommodated in the end disc and the valve body is axial movably mounted in the end disc of the filter insert. On the other hand, in the housing structure a supporting dome is provided which serves for mounting of a spring which is responsible for the initial tension of the filter bypass valve, thereby defining the opening pressure. The valve body is fastened movably in the filter insert in such a way that it is also replaced when the filter element is changed. In this way an unacceptably high contamination of the valve body, for example by soot deposits, can be avoided. The spring remains in the supporting dome when the filter element is replaced.

In the known liquid filter it is regarded as disadvantageous that due to the integration of the valve body the filter insert is relatively complex and therefore expensive. It has also proved unfavorable that the guiding of the valve body in the filter insert is difficult and that twisting and leaks of the bypass valve caused thereby cannot be reliably ruled out. This problem is also caused by the fact that the spring preloading the valve body in the closing direction of the filter bypass valve is part of the filter housing and that thus at every change of the filter insert it must be ensured that the spring and the valve body are brought into exact abutment on one another.

The document DE 299 15 843 U1 shows a filter, such as an oil filter, with a filter housing with a cover, a filter insert and a central standpipe with drain valve function. In addition, according to claim 7 a filter bypass valve is provided, the valve body of which is axially movably guided on the cover and is preloaded in the closing direction by a spring supported on the cover. The valve seat is disposed in the upper end disc of the filter insert. The force for opening the valve is generated here by the effect of the oil pressure on a flange of the valve body guided in a sealed manner in the cover.

In this known liquid filter it is regarded as disadvantageous that the valve body in its axial movement is subject to relatively substantial friction because it is sealed against the cover by means of a radial seal. This friction can lead to malfunctions of the filter bypass valve or, in the event that the seal of the valve body sticks on the guide surface in the cap, can even lead to failure of the filter bypass valve function.

Therefore the object of the present invention is to provide liquid filters of the aforementioned type which avoid the disadvantages of the prior art and in which a simpler, more cost-effective filter insert can be used and reliable functioning of the filter bypass valve is ensured. Moreover a corresponding filter insert should be provided.

SUMMARY OF THE INVENTION

A first solution to the first part of the object relating to the liquid filter is achieved according to the invention by a liquid filter of the aforementioned type which is characterized in that the valve body is movably guided in the filter housing on a filter housing part, in that the two sealing contours are offset from each other in the axial direction, and in that the valve body has a corresponding conical or tapered or dome-like shape in the sealing area of the valve body that interacts with the sealing contours.

Thus according to the invention the valve body is a part of the filter housing and not of the filter insert, so that the filter insert is structurally substantially simpler and as a result is more cost-effective to produce. For the movable guiding a a filter housing part is used which simplifies exact guiding of the valve body and prevents unwanted twisting and leakages of the bypass valve caused thereby. In particular in this case a more complex design of the guide of the valve body only leads to higher costs once, since the valve body and its guide are lifetime components of the liquid filter. Moreover, the two sealing contours are offset from one another in the axial direction, and the valve body has a corresponding conical or tapered or dome-like shape in the sealing area which interacts with the sealing contours. Advantageously as a result the valve body and the valve seat are automatically aligned suitably relative to one another under the preload force acting on the valve body in the closing direction, which ensures good and permanent sealing of the filter bypass valve in its closed position. Moreover, in this embodiment the filter bypass valve only requires a relatively small diameter for its installation space, which is advantageous for a compact construction.

A second solution to the first part of the object relating to the liquid filter is achieved according to the invention by a liquid filter of the of the aforementioned type which is characterized in that the valve body is movably guided in the filter housing on a filter housing part, and in that the valve body simultaneously forms a locking element of a mounting lock against the installation of unauthorized filter inserts, wherein a latching device is provided which locks the valve body against an axial movement and which during installation of a filter insert can be unlatched only by matching unlatching means on an associated filter insert.

In this liquid filter according to the invention the valve body simultaneously forms a locking element of a mounting lock against the installation of unauthorized filter inserts, which gives the valve body a double function and which makes possible the integration of the mounting lock into the liquid filter without occupying additional space.

In a further embodiment of the second filter according to the invention the two sealing contours are preferably offset from one another in the axial direction, and the valve body has a corresponding conical or tapered or dome-like shape in the sealing area which interacts with the sealing contours. Thus advantageously also in the second filter according to the invention the valve body and the valve seat are automatically aligned suitably relative to one another under the preload force acting on the valve body in the closing direction, and the filter bypass valve only requires a relatively small diameter for its installation space.

The positioning of the filter bypass valve and the individual parts thereof within the liquid filter explained above may be different. A first embodiment of the liquid filters which is preferred in this connection provides that they are designed as standing filters, that the valve seat is disposed on an end disc of the filter insert which is at the top in the installed state, and that the valve body is guided in the cover which closes the filter housing at the top.

An alternative preferred embodiment of the liquid filters proposes that they are designed as standing filters, that the valve seat is disposed on an end disc of the filter insert which is at the top in the installed state, and that the valve body is guided at the top on a standpipe which extends in or through the filter insert, is connected to the filter housing or is integral therewith.

In a third embodiment of the liquid filters in this connection it is provided that they are designed as standing filters, that the valve seat is disposed on an end disc of the filter insert which is at the bottom in the installed state, and that the valve body is guided at the bottom on a standpipe which extends in or through the filter insert, is connected to the filter housing or is integral therewith.

Moreover, the liquid filters according to the invention can be designed as suspended filters, wherein the valve seat is disposed on an end disc of the filter insert which is at the top in the installed state, and that the valve body is guided in the cover which closes the filter housing at the top.

A further alternative embodiment of the liquid filters according to the invention proposes that they are designed as suspended filters, that the valve seat is disposed on an end disc of the filter insert which is at the top in the installed state, and that the valve body is guided in the filter housing above the filter insert. This embodiment has, like the other embodiments with a filter bypass valve disposed at the top in the filter housing, the specific advantage that dirt particles entrained in the liquid to be filtered, which fall due to the effect of gravity and collect at the bottom in the filter housing, are far away from the filter bypass valve and therefore do not disrupt filter bypass valve.

For the embodiments of the liquid filters, in which the valve body is guided in the cover of the filter housing, it is preferably provided that the cover has a central draining and/or ventilating screw and that the valve body is guided in the draining and/or ventilating screw. In this way a particularly compact arrangement is achieved, because a space which is present in any case within the draining and/or ventilating screw is used for the accommodation of the valve body.

The preload force which acts on the valve body in the closing direction is advantageously generated by at least one spring, preferably a helical spring, supported on the one hand on a part of the filter housing and on the other hand on the valve body. The spring advantageously always remains between the part of the filter housing which supports them and the valve body and maintains permanent contact with the two components, so that the valve body always exactly and reliably preloaded with the force acting on it in the closing direction. A desired value for the pressure difference between the unfiltered side and the filtered side of the liquid filter, at which the filter bypass valve should open, can be fixed by suitable selection of the spring.

With regard to the specific geometric design of the sealing contours the liquid filters according to the invention offer a great freedom of design. The two sealing contours are preferably round and disposed concentrically to one another, wherein the shape of the valve body is of course adapted appropriately. Alternatively the two sealing contours can also be designed differently, wherein here too of course the shape of the valve body itself is adapted to the sealing contours.

In order to achieve good sealing of the bypass valve in the closed position thereof and at the same time to enable a certain equalization of tolerances, it is proposed that at least one of the two sealing contours is constructed from an elastomer or with an elastomeric coating. In this way at least one of the two sealing contours is configured flexibly, so that both a good sealing contact of the valve body and also an equalization of dimensional tolerances are achieved.

In a further embodiment of the liquid filter according to the invention the two sealing contours are implemented with different hardness. In other words this means that one sealing contour is more flexible than the other sealing contour, so that a desired equalization of tolerances is possible which rules out leaks to the greatest possible extent.

For the purpose of simple and cost-effective mass production it is preferably provided that the sealing contours are integrally molded onto the associated end disc and/or the valve body or are injection molded thereon.

A further simplification of the production of the filter insert may be achieved according to the invention in that preferably a seal, which in the installed state of the filter insert separates the unfiltered side and the filtered side of the liquid filter from one another, is disposed between the filter housing and the filter insert on the same end disc of the filter insert as the sealing contours of the filter bypass valve. Thus all sealing elements are concentrated on an end disc of the filter insert in a favorable and advantageous manner in terms of manufacturing technology.

A further increase in economic efficiency in the manufacture of the filter insert can be achieved if, as the invention proposes, the seal between the unfiltered side and the filtered side is combined with at least one of the sealing contours to produce a sealing ring.

In order to achieve a favorable geometric arrangement of the bypass valve it is also preferably provided according to the invention that on the end disc the valve seat having the valve seat the filter insert has an axial and oblique radially outwardly extending flange, of which the axially outwardly directed side forms the valve seat with the two sealing contours, and that the at least one filter bypass channel extends through the flange between the sealing contours.

To this end the flange can advantageously be designed integrally with the associated end disc, which is expedient for cost-effective mass production. Alternatively the flange can also be manufactured as a separate component and can be connected, preferably welded or bonded or clipped or latched, to the associated end disc. This embodiment offers the possibility of retrofitting as required existing conventional filter inserts with the valve seat, so that the filter insert per se is manufactured unchanged in large quantities and then can be used selectively without or with a valve seat. The flange can also be combined for example with a supporting grid for the filter material element of the filter insert to form one component.

Furthermore the invention relates to a filter insert for a liquid filter as claimed in any one of the preceding claims, in particular oil filters or fuel filters for an internal combustion engine, comprising a hollow cylindrical filter material element enclosed at the end faces by two end discs, and comprising a valve seat of a filter bypass valve arranged on one of the end discs with two closed sealing contours arranged one inside the other as viewed in the radial direction, wherein at least one bypass channel which bypasses the filter material element passes through the valve seat between the sealing contours.

The solution to the second part of the above-mentioned object relating to the filter insert is achieved according to the invention with a filter insert of the above-mentioned type which is characterized in that it is designed without a valve body.

Thus due to the absence of the valve body the filter insert can be of technically simple design and can be produced cost-effectively, so that in the regularly recurring replacement of the filter insert only a relatively inexpensive element is used in each case. As a result costs savings are made over the entire period of use of the associated liquid filter.

The embodiments of the filter insert according to the invention provide in particular
- that the two sealing contours are offset from one another in the axial direction,
- that the two sealing contours are round and disposed concentrically to one another,
- that at least one of the two sealing contours is constructed from an elastomer or with an elastomeric coating,
- that the two sealing contours are implemented with different hardness,
- that the sealing contours are integrally molded onto the associated end disc or are injection molded thereon,
- that a seal, which in the installed state of the filter insert separates an unfiltered side and a filtered side of the liquid filter from one another, is disposed on the same end disc of the filter insert as the sealing contours of the filter bypass valve,
- that the seal between the unfiltered side and the filtered side is combined with at least one of the sealing contours to produce a sealing ring,
- that on the end disc having the valve seat the filter insert has an axially and obliquely radially outwardly extending flange, of which the axially outwardly directed side forms the valve seat with the two sealing contours, and that the at least one bypass channel extends through the flange between the sealing contours,
- that the flange is constructed integrally with the associated end disc or that the flange is manufactured as a separate component and is connected, preferably welded or bonded or clipped or latched, to the associated end disc, and/or
- that the flange manufactured as a separate component comprises a supporting grid for the filter material element of the filter insert.

A further embodiment of the filter insert according to the invention provides on the filter insert unlatching means by means of which with the filter insert installed in an associated liquid filter a latching device can be unlatched, by which a valve body which simultaneously forms a locking element of a mounting lock against the installation of unauthorized filter inserts is locked against axial displacement. The filter insert here has the additional function of a key by which the latching device can be unlatched. In this way installation of an unauthorized filter insert which does not have this key is ruled out.

A specific modification in this respect is characterized in that the unlatching means are formed by one or more radially inwardly directed lugs which are disposed on the internal periphery of a central aperture in one of the end discs. Thus the unlatching means are accommodated in a space-saving and damage-proof manner.

The two sealing contours and the unlatching means are preferably all provided on one of the two end discs of the filter insert, so that a concentrated arrangement with a compact construction is achieved.

BRIEF DESCRIPTION OF THE DRAWINGS

Embodiments of the invention are explained below with reference to the drawings. In the drawings.

DETAILED DESCRIPTION OF THE PREFERRED EMBODIMENTS

Figure 1:
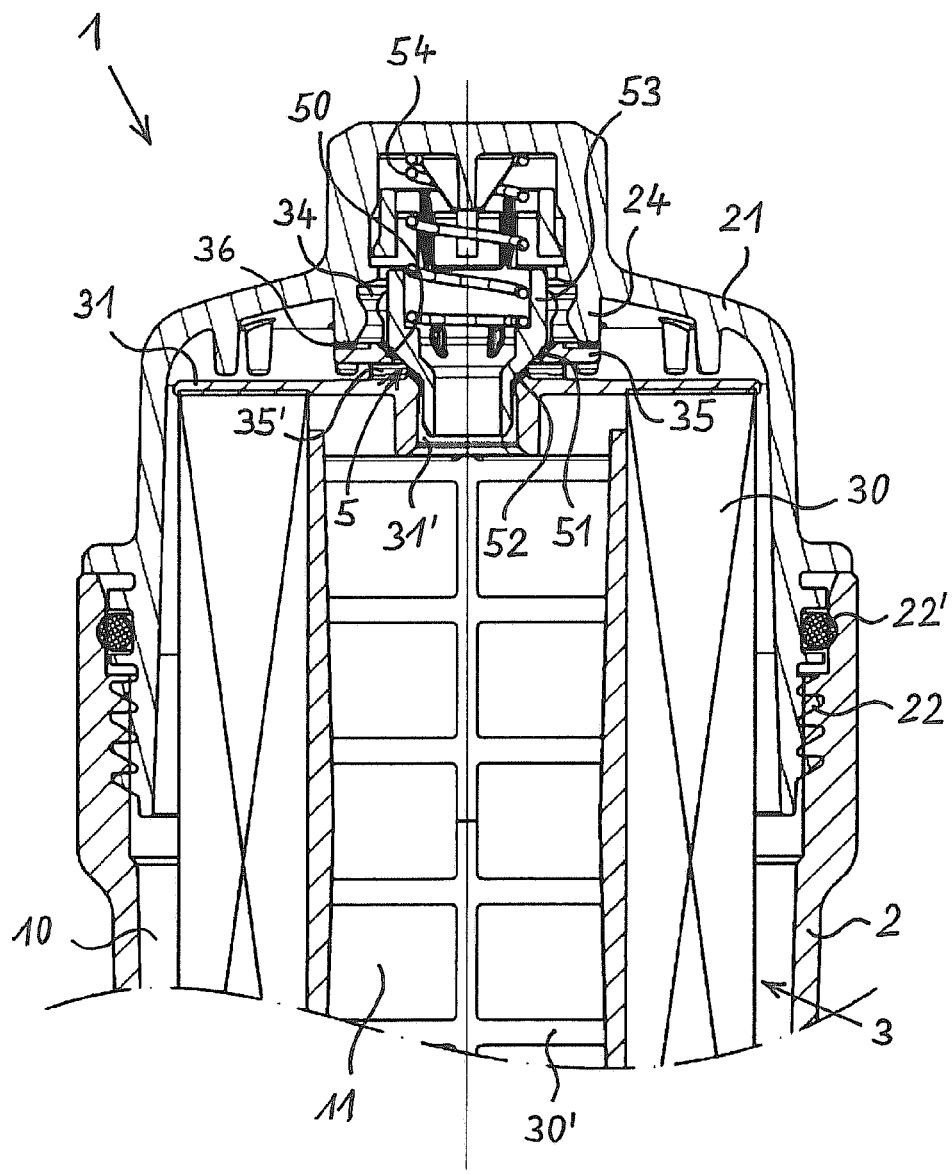
FIG. 1 shows a liquid filter with a filter bypass valve in a first embodiment, in a partial longitudinal section.

In the following description of the drawings identical parts are always designated by the same reference numerals, so that all reference numerals do not have to be explained in relation to every figure of the drawings.

FIG. 1 of the drawings shows a first embodiment of a liquid filter 1 with a filter bypass valve 5. The liquid filter 1 has a cup-shaped housing 2, of which only the upper part is visible in FIG. 1. A cover 21 is releasably connected to the housing 2, in this case by means of a screw connection 22 with an associated seal 22'. In the interior of the housing 2 is disposed a filter insert 3 which consists of a hollow cylindrical filter material element 30 and two end discs enclosing the latter at the end faces, of which only an upper end disc 31 is visible here. In the interior of the filter insert 3 is disposed a supporting grid 30' which supports the filter material element 30 against collapse as it is flowed through.

On its sub-page the cover 21 has an integrally formed locking ring 24 which interacts with locking tabs 34 formed on the upper face of the upper end disc 31 of the filter insert 3. By means of this the filter insert 3 by the cap 21 is releasably latched to the cover 21.

The filter bypass valve 5 comprises a valve seat 50 disposed on the upper end disc 31 and a valve body 53 which is axially movably guided in the cover 21 axial. The seal seat 50 here comprises two sealing contours 51 and 52 which are concentric to one another and spaced apart from one another in the radial and axial direction and which are disposed on the upwardly directed side of a flange 35 formed integrally with the upper end disc 31. At least one bypass channel 35' which opens between the two sealing contours 51 and 52 extends radially inwards from the outside through the flange 35. Thus only the seal seat 50 and the at least one bypass channel 35' are formed on the filter insert 3, whereas the valve body 53 is not part of the filter insert 3 but a part of the cover 21 which itself forms a part of the filter housing 2.

The valve body 53 which interacts with the seal seat 50 is adapted in its external shape to the arrangement of the sealing contours 51 and 52 so that in the closed position thereof shown in FIG. 1 it rests in a sealing manner on both sealing contours 51 and 52. In this closed position the valve body 53 is pressed by a helical spring 54 which is supported on the one hand on the underside of the cover 21 and on the other hand on the upper face of the valve body 53. In the illustrated closed position of the filter bypass valve 5 the bypass channel 35' or the bypass channels 35' is or are closed. In this state a liquid to be filtered flows radially from the outside inwards from an unfiltered side 10 of the filter 1 through the filter material element 30 onto a filtered side 11 of the filter 1.

The liquid to be filtered is fed via a liquid inlet which is not visible in the drawing to the unfiltered side 10; the filtered liquid is discharged via an outlet which likewise is not visible in FIG. 1.

Figure 2:
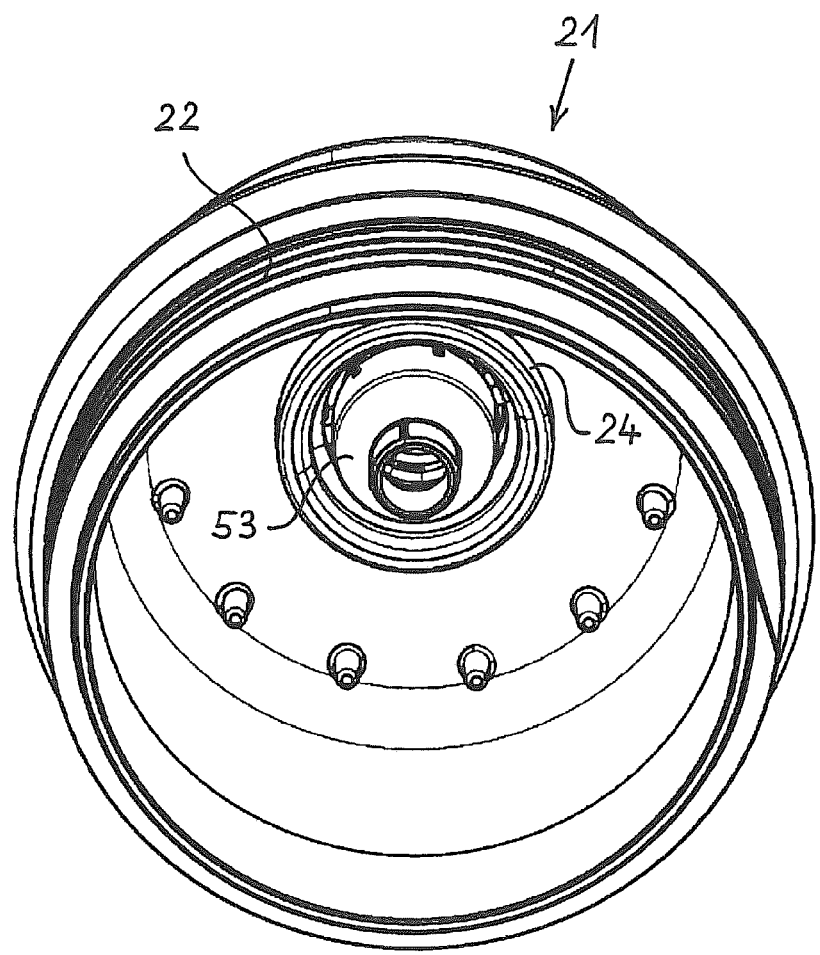
FIG. 2 shows a housing cover of the liquid filter according to FIG. 1, in a view of the inside thereof.

FIG. 2 shows the cover 21 according to FIG. 1 in a view of the underside thereof. The circumferential locking ring 24, which surrounds the valve body 53 axially movably guided in the cover 21, is located centrally in the cover 21. An external thread for the screw connection 22 is visible radially externally on the cover 21.

Figure 3:
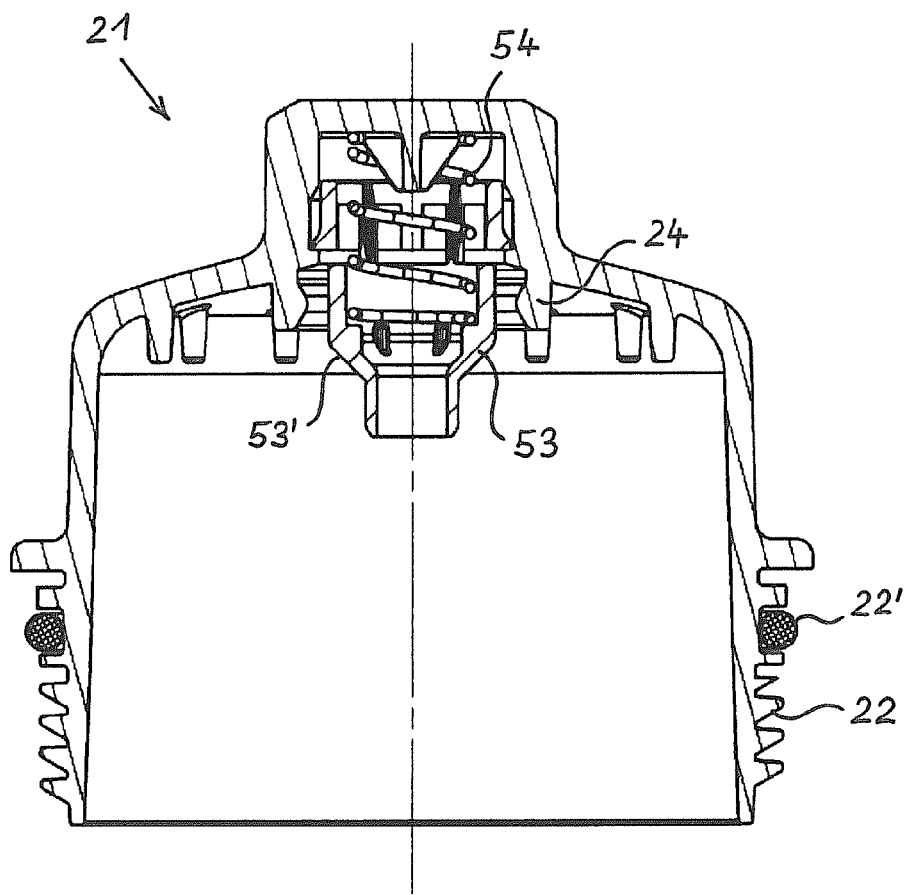
FIG. 3 shows the cover according to FIG. 2 in longitudinal section.

FIG. 3 shows the cover 21 according to FIG. 2 in longitudinal section. The valve body 53 is axially movably and undetachably guided centrally in the upper part of the cover 21, and the helical spring 54 is disposed between the cover 21 and the valve body 53 and acts on the valve body 53 in the closing direction with a preload force. A conically extending external surface area of the valve body 53 forms the sealing area 53' of the valve body which interacts with the valve seat 50 provided on the filter insert 3 (not shown here). The external thread for the screw connection 22 and the seal 22' are again visible externally on the lower part of the cover 21.

Figure 4:
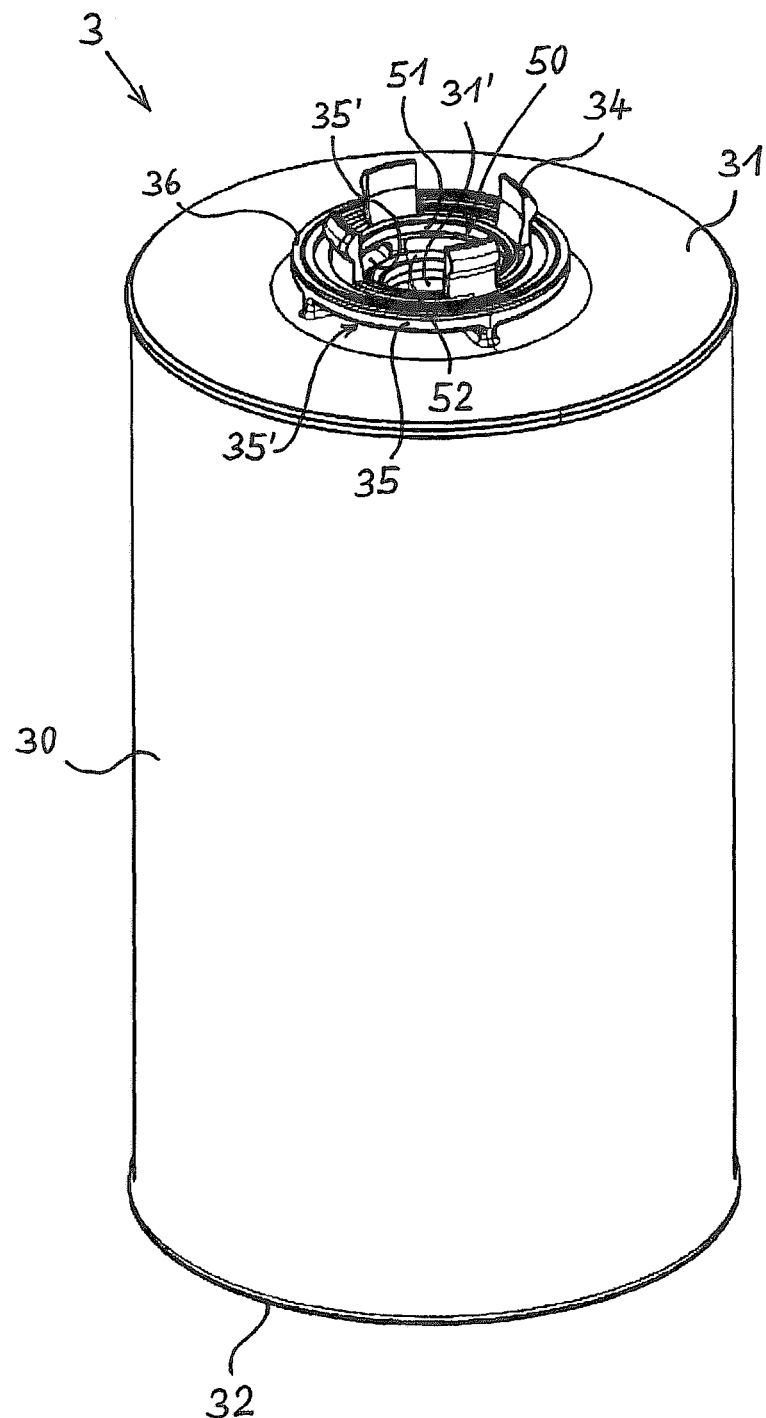
FIG. 4 shows a filter insert of the liquid filter according to FIG. 1, in elevation.

FIG. 4 of the drawings shows the filter insert 3 of the liquid filter 1 according to FIG. 1 in a perspective view obliquely from above. The filter insert 3 consists of the hollow cylindrical filter material element 30 and the two end discs 31 and 32 which are connected, for example bonded or welded, in a sealing manner to the filter material element 30. In the upper end disc 31 a central aperture 31' is provided which is surrounded by the flange 35. A plurality of bypass channels 35' oriented in the radial direction extend through the flange 35 from the outside inwards. Internally the bypass channels 35' open between the two concentric sealing contours 51 and 52 of the valve seat 50. Moreover, the locking tabs 34 by means of which the filter insert 3 can be latched to the cover 21 (not shown here) are formed on the flange 35.

Figure 5:
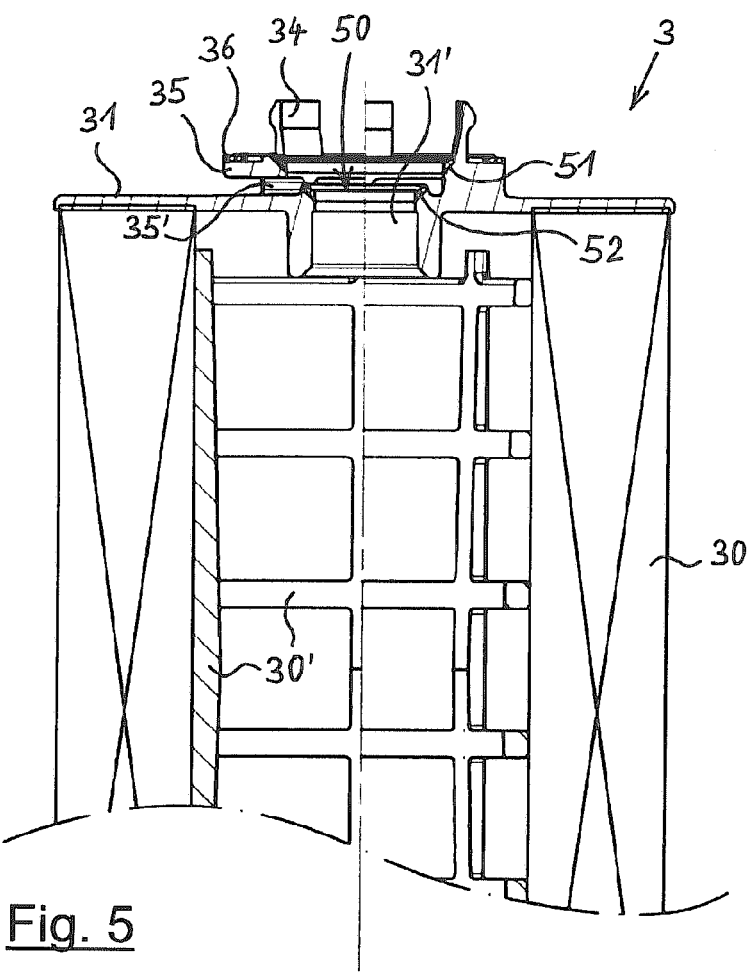
FIG. 5 shows the filter insert according to FIG. 4 in a partial longitudinal section through the upper part thereof.

FIG. 5 shows the filter insert 3 according to FIG. 4 in a longitudinal section through the upper part thereof. Only the upper part of the filter material element 30 and the supporting grid 30' disposed therein are shown here. In this respect only the upper end disc 31 is also visible here, which is formed integrally with the axially upwardly projecting flange 35. At least one bypass channel 35' which opens at its radially inner end between the two sealing contours 51 and 52 of the seal seat 50 extends radially inwards from the outside through the flange 35. The locking tabs 34 extend upwards away from the flange 35.

Figure 6:
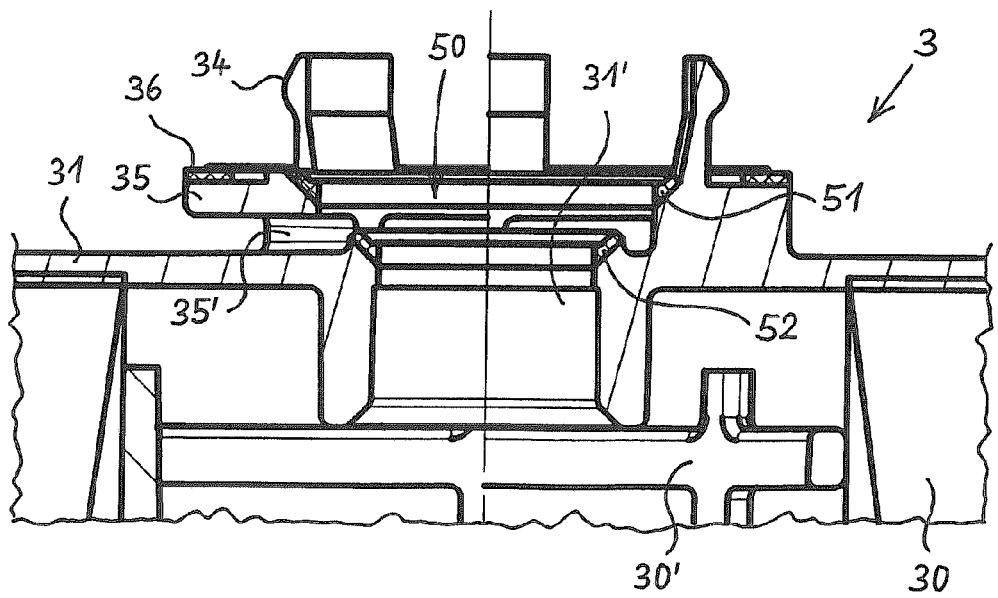
FIG. 6 shows a detail of the filter insert according to FIG. 5 on an enlarged scale.

In FIG. 6 the central part of the upper end disc 31 of the filter insert 3 according to FIG. 5 is shown on an enlarged scale. A small part of the filter material element 30 and of the supporting grid 30' is still discernible below the end disc 31. In the center of the end disc 31 is located the central aperture 31' thereof which is surrounded by the flange 35. The two concentric sealing contours 51 and 52 which are disposed axially above one another and interact with the valve body 53 (not shown here) are formed radially internally on the flange 35. Again at least one bypass channel 35' which opens radially internally between the two sealing contours 51 and 52 extends radially inwards from the outside through the flange 35. The locking tabs 34 extend upwards in the axial direction away from the flange 35.

A sealing ring 36 which serves, in the installed state of the filter insert 3, to separate the unfiltered side 10 from the filtered side 11 of the liquid filter 1 is disposed radially externally on the upper face of the flange 35.

Figure 7:
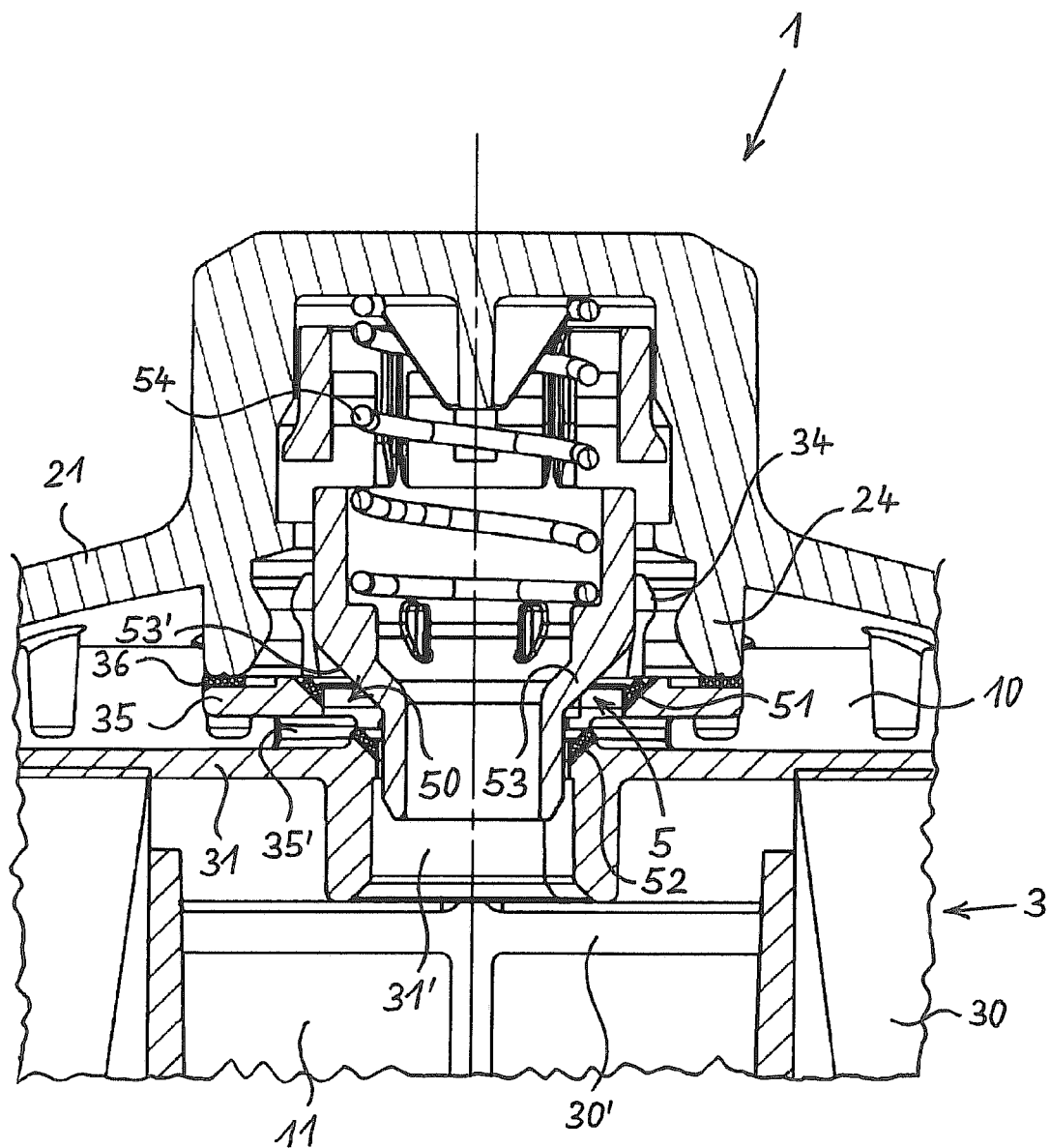
FIG. 7 shows the liquid filter according to FIG. 1 in a partial longitudinal section, with the filter bypass valve opened.

FIG. 7 shows the upper central part of the liquid filter 1 according to FIG. 1 containing the filter bypass valve 5 in an enlarged longitudinal section, now with the filter bypass valve 5 opened. In its open state the annular valve body 53 is moved upwards, i.e. away from its valve seat 50, against the force of the spring 54 due to a liquid pressure difference which exceeds a predeterminable threshold value. As a result the at least one bypass channel 35' is opened from the unfiltered side 10 to the filtered side 11 of the filter 1 and an immediate overflow of the liquid can take place. This state occurs in particular when the filter material element 30 is blocked by particles of dirt retained therein to such an extent that it is no longer possible for the liquid to pass through.

By means of the locking ring 24 on the underside of the cover 21 and the locking tabs 34 on the upper face of the end disc 31 the filter insert 3 is latched to the cover 21 so that these two parts of the filter 1 can be handled together, in particular when the filter insert is changed.

Furthermore FIG. 7 shows the function of the seal 36 which is disposed on the upper face of the flange 35 and now rests in sealing contact on the lower end face of the locking ring 24 of the cover 21. As a result the unfiltered side 10 is sealed against the filtered side 11 of the filter 1. Provided that the filter bypass valve 5 is closed, in the normal operation of the filter 1 the liquid to be filtered can flow from the unfiltered side 10 only through the filter material element 30 to the filtered side 11, since a direct connection is obstructed by the seal 36. A direct connection from the unfiltered side 10 to the filtered side 11 is only enabled when the filter bypass valve 5 is opened.

The embodiment previously described with reference to FIGS. 1 to 7 relates to a standing liquid filter. In contrast to this, in FIGS. 8 to 14 a suspended liquid filter 1 is shown as a further embodiment. Also the suspended liquid filter 1 has a filter housing 2, wherein this is closed on its underside by a cover 21 which is again releasably connected to the filter housing 2 by means of a screw connection 22 with inlaid seal 22'.

In the interior of the filter housing 2 a filter insert 3 is again disposed which here too consists of a hollow cylindrical filter material element 30 with an upper end disc (not shown here) and a lower end disc 32 and a supporting grid 30' disposed in its interior. The lower end disc 32 has a central aperture 32' surrounded by a flange 35 which here is integrally formed, axially protruding, on the underside of the lower end disc 32. Again at least one bypass channel 35' which opens radially internally between the two sealing contours 35 and 52 extends radially inwards from the outside through the flange 35. A valve seat 50 with two round sealing contours 51 and 52 concentric to one another is again provided radially internally on the flange 35, wherein here too the sealing contours 51 and 52 are spaced apart from one another in the axial direction. The radially inner end of the bypass channel 35' is located between the two sealing contours 51 and 52.

Figure 8:
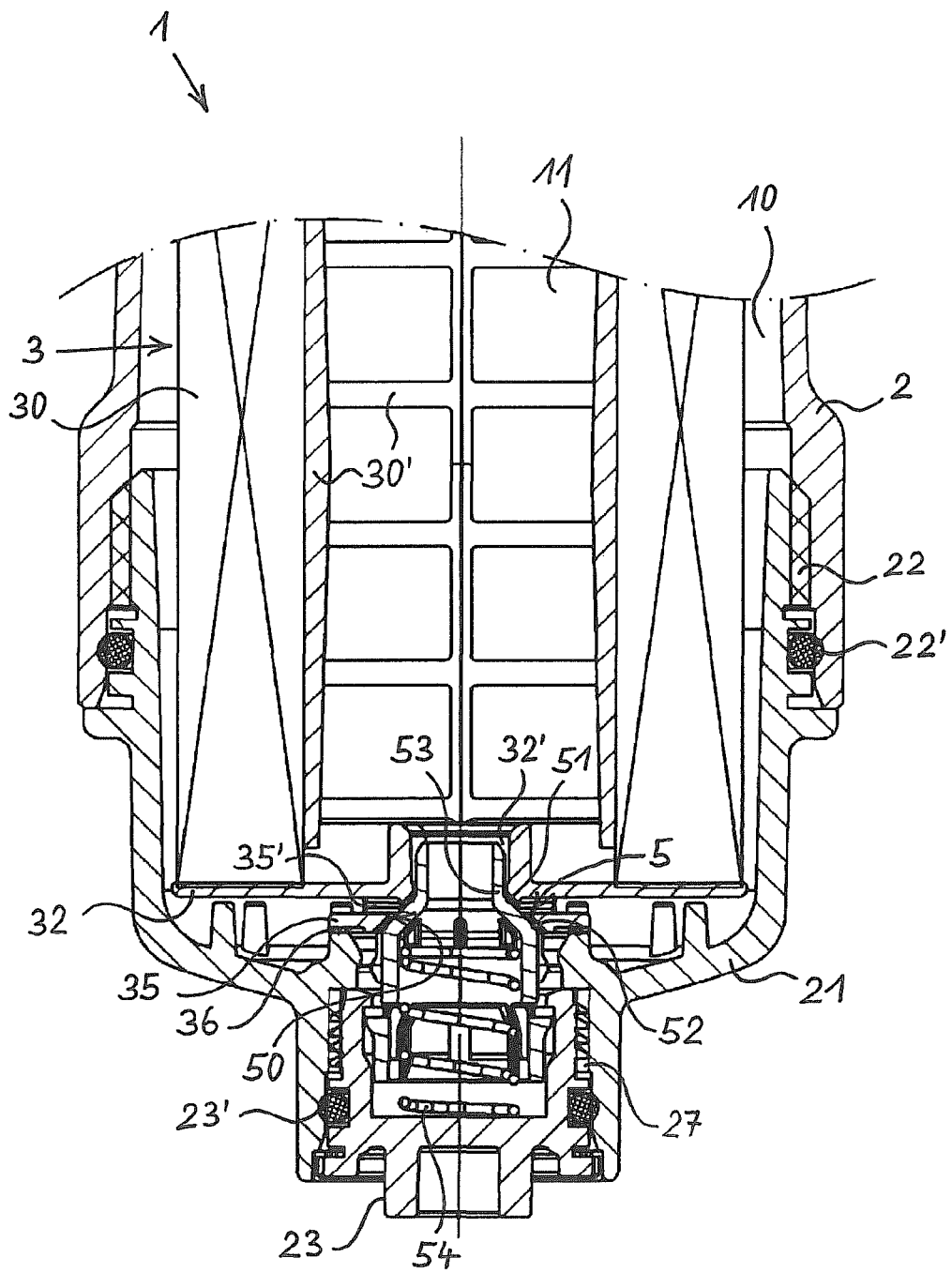
FIG. 8 shows the liquid filter with a filter bypass valve in a first embodiment, in a partial longitudinal section.

The cover 21 in this case has in its center a screw-in opening 27 with an internal thread into which a draining screw 23 is screwed from below a seal 23' interposed. An annular valve body 53 which interacts in a sealing manner with the sealing contours 51 and 52 of the valve seat 50 is axially movably guided in the draining screw 23 when it is located in its closed position, as shown in FIG. 8. In this state of the filter bypass valve 5 the bypass channel 35' is closed in a liquid-tight manner. Liquid to be filtered can then flow from the unfiltered side 10 of the filter 1 only through the filter material element 30 to the filtered side 11 of the filter 1. In its closed position the valve body 53 is held by the force of a spring 54 which is supported on the one hand on the upper face of the draining screw 53 and on the other hand on the underside of the valve body 23.

Figure 9:
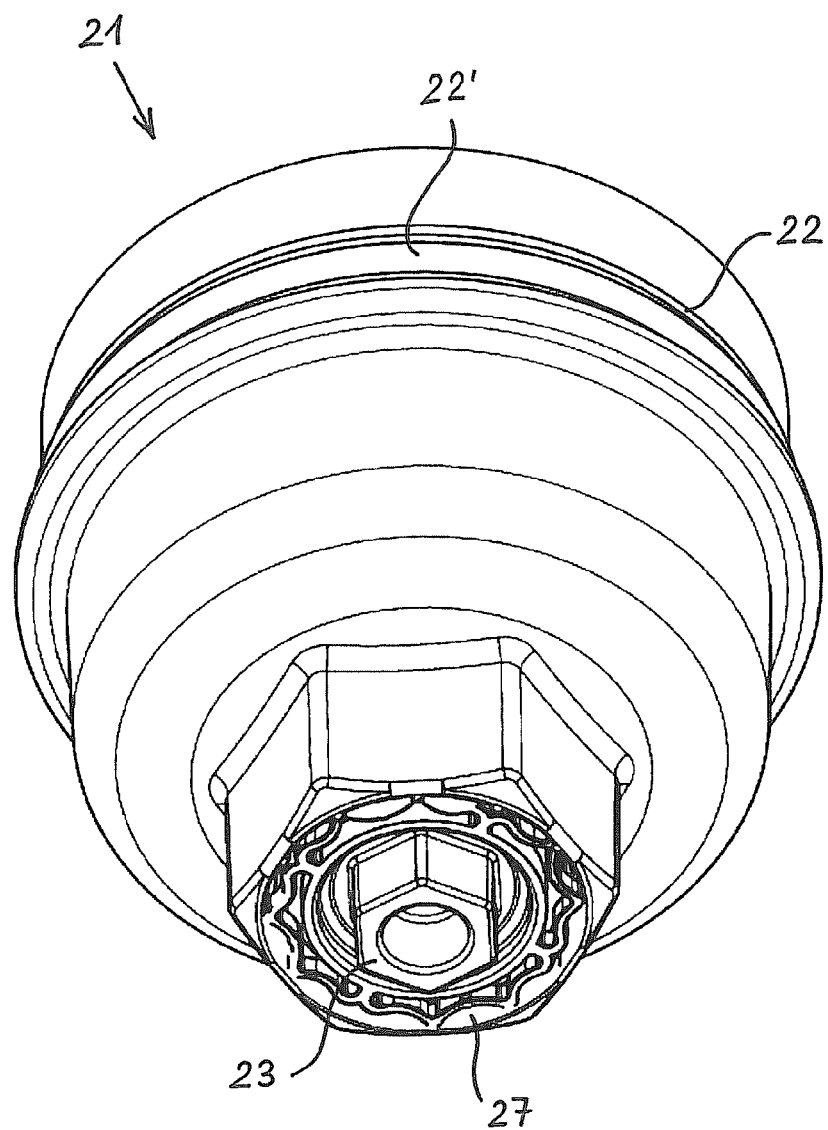
FIG. 9 shows a housing cover of the liquid filter according to FIG. 8, in a view of the outside thereof.

In FIG. 9 the cover 21 of the liquid filter 1 according to FIG. 8 is shown as an individual part in a view obliquely from below. The draining screw 23 which is screwed into the screw-in opening 27 located centrally in the cover is visible in the center of the cover 21. The screw connection 22 with the sealing ring 22' is located in the upper region of the external periphery of the cover 21.

Figure 10:
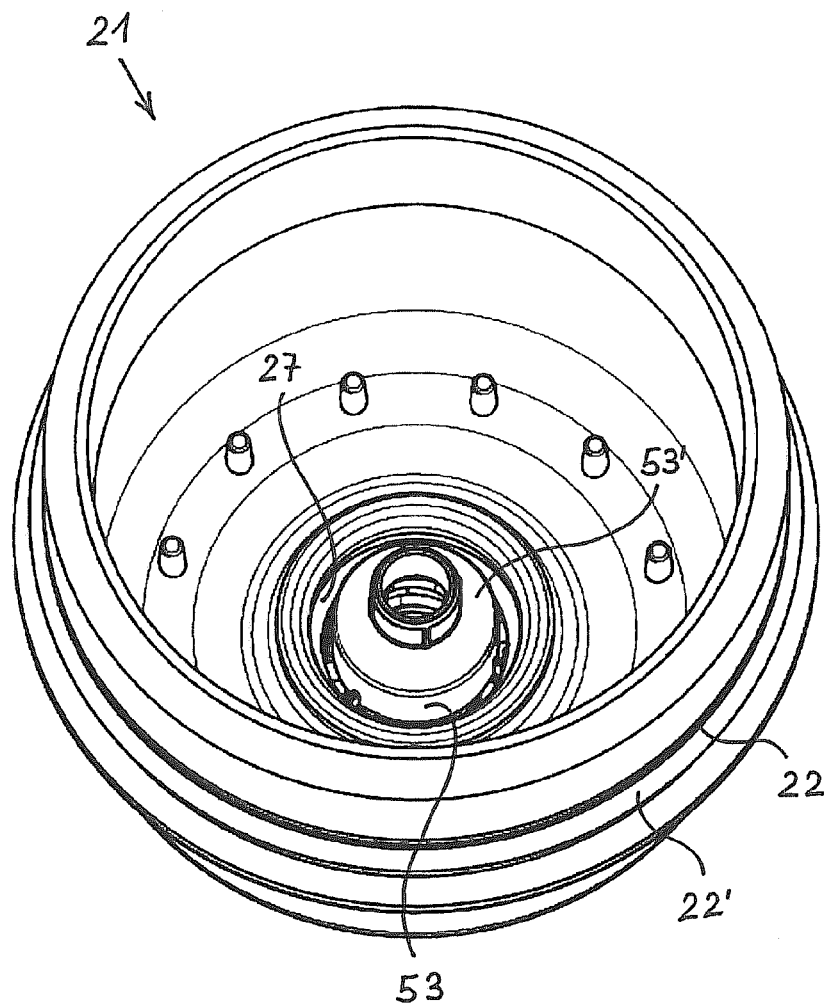
FIG. 10 shows the cover according to FIG. 9, in a view of the inside thereof.

FIG. 10 shows the cover 21 according to FIG. 9 in a view of the side thereof facing upwards in FIG. 8, so that the interior of the cover 21 is then visible. The screw-in opening 27 into which the draining screw 23 with the valve body 53 is screwed is located in the center of the cover 21. The conical or tapered sealing area 53' of the valve body 53 is now facing the observer. The screw connection 22 with the sealing ring 22' is located radially externally on the cover 21.

Figure 11:
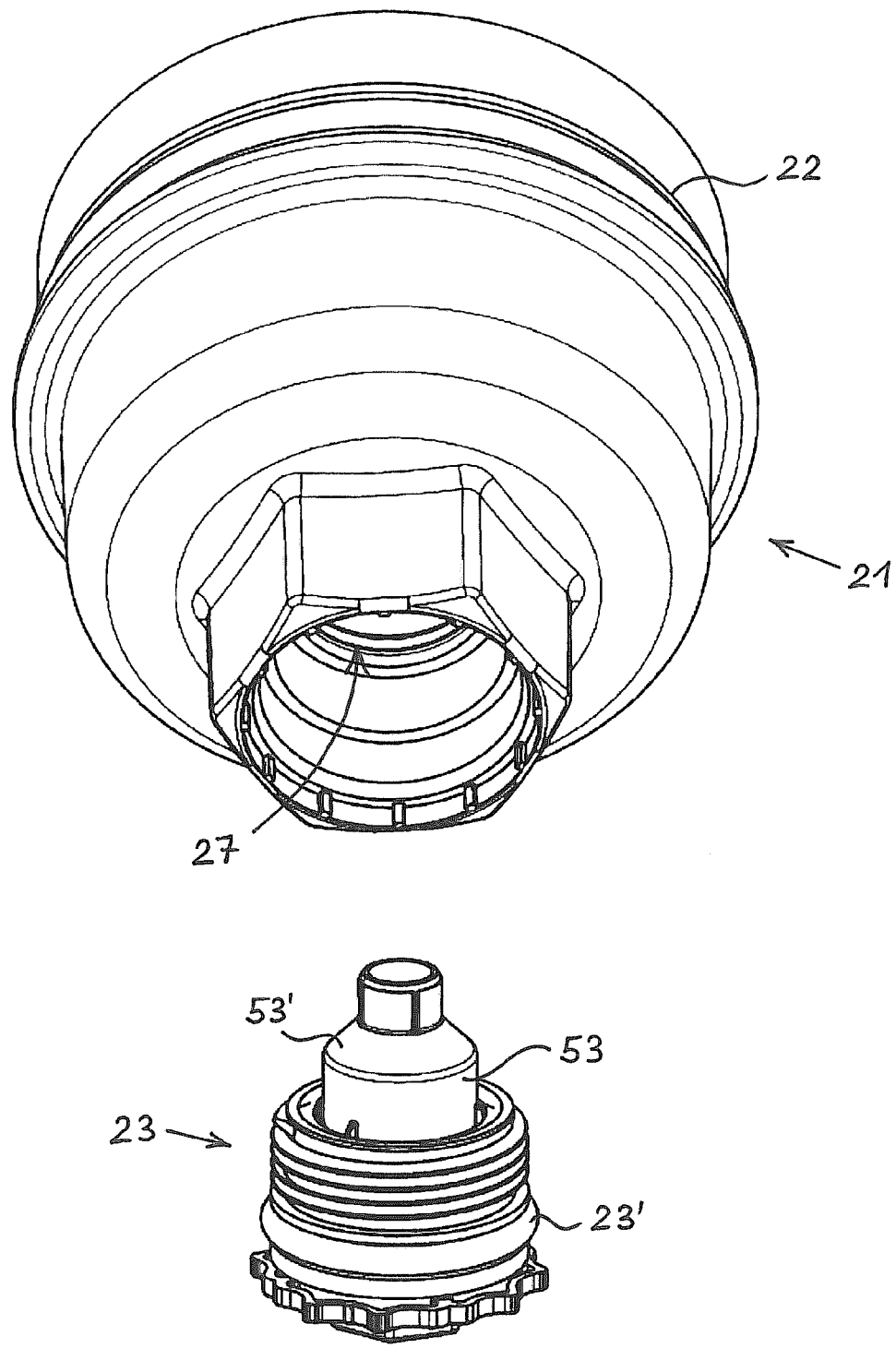
FIG. 11 shows the cover according to FIG. 10 together with a draining screw with a valve body of the filter bypass valve, in elevation.

In FIG. 11 the cover 21 and the draining screw 23 are shown separated from one another. The cover 21 with its now open central screw-in opening 27 and its external thread for the screw connection 22 visible at the top of FIG. 11. The draining screw 23 which is unscrewed from the screw-in opening 27 and which has a thread and a sealing ring 23' on its external periphery is shown at the bottom in FIG. 11. The valve body 53 is axially movably guided in the interior of the draining screw 23, wherein an upper part of the valve body 53 with the sealing area 53' projects axially out of the draining screw 23.

Figure 12:
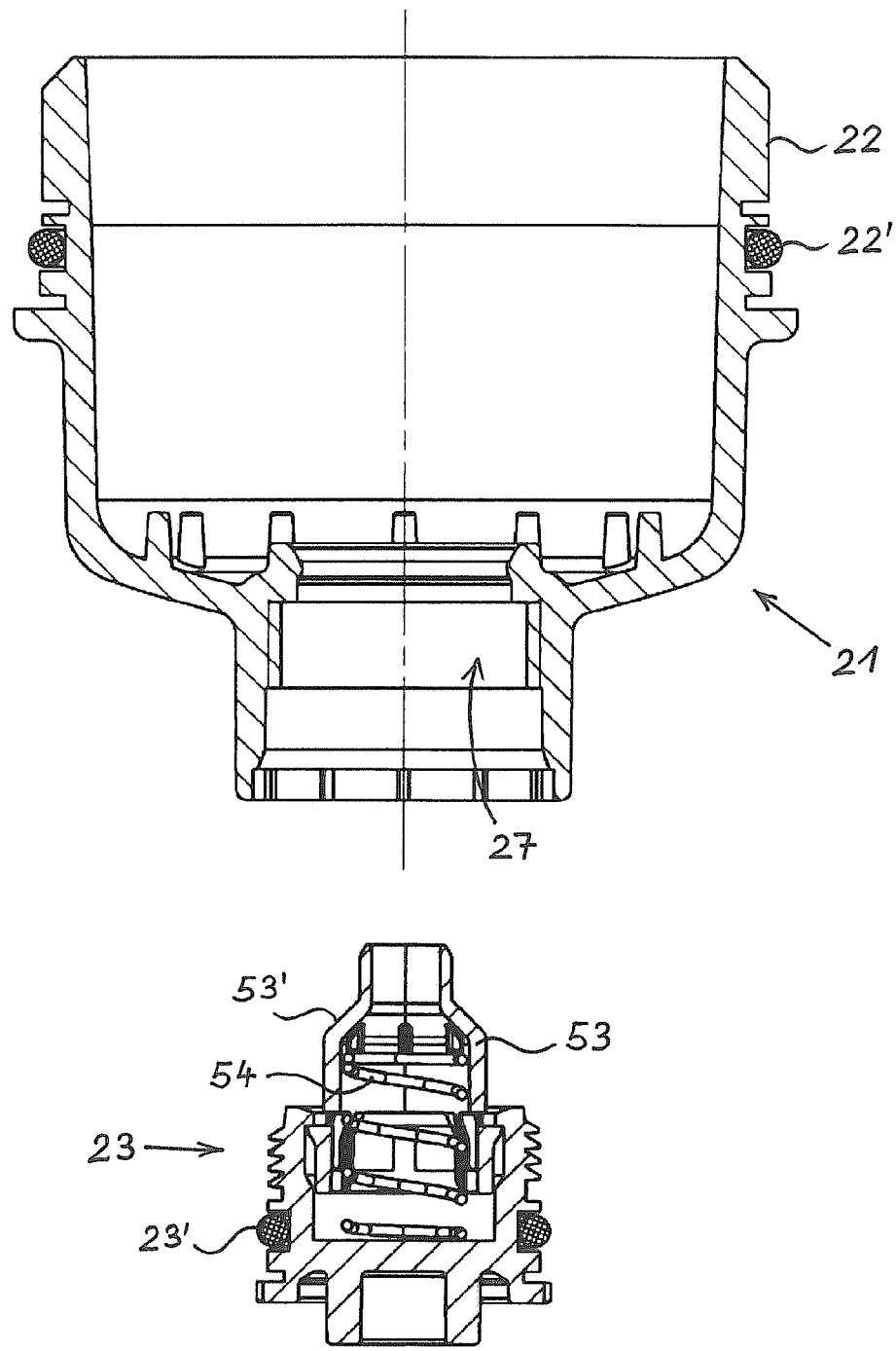
FIG. 12 shows the cover and the draining screw according to FIG. 11 in each case in longitudinal section.

FIG. 12 shows the cover 21 and the draining screw 23 according to FIG. 11, in each case in longitudinal section, again separated from one another. The draining screw 23 is unscrewed from the cover 21 for example for the purpose of emptying the filter housing 2 before a change of the filter insert.

The cover 21 with its central screw-in opening 27 and with its external thread for the screw connection 22 and with the sealing ring 22' is again visible at the top in FIG. 12.

The draining screw 23 is now visible in longitudinal section at the bottom in FIG. 12, wherein the axial guiding of the valve body 53 in the interior the draining screw 23 is clear. The spring 54 acts on the valve body 53 with a preload force acting in the closing direction. The sealing area 53' of the valve body 53 is disposed on the upwardly facing side of the valve body 53.

Figure 13:
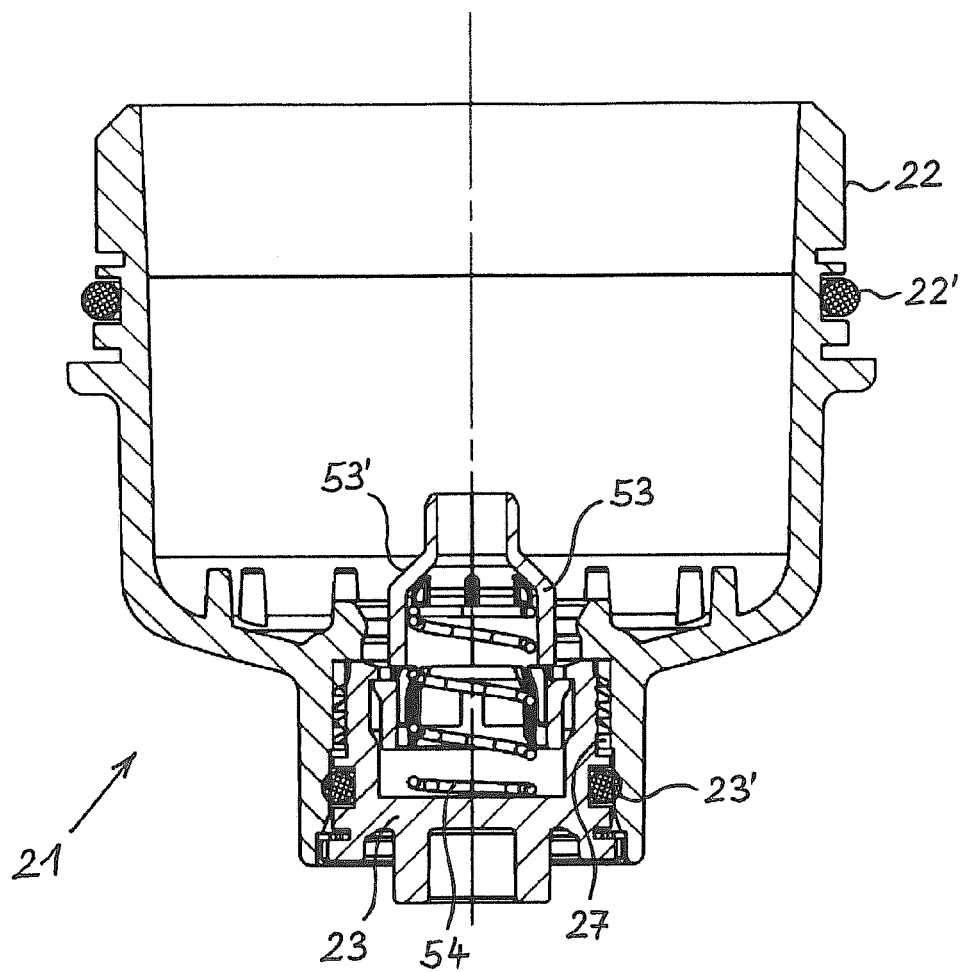
FIG. 13 shows the cover and the draining screw according to FIG. 12 in the assembled state, in longitudinal section.

FIG. 13 shows the cover 21 and the draining screw 23 according to FIG. 12 in longitudinal section, now in the assembled state. The draining screw 23 is now completely screwed into the screw-in opening 27 and the draining screw 23 and the cover 21 are sealed against one another in a liquid-tight manner by the seal 23'. The valve body 53 with its conical sealing area 53' is axially movably but undetachably guided in the interior of the draining screw 23. The spring 54, which is disposed partially in the interior of the draining screw 23 and partially in the interior of the annular valve body 53, exerts a preload force in the closing direction on the valve body 5.

Figure 14:
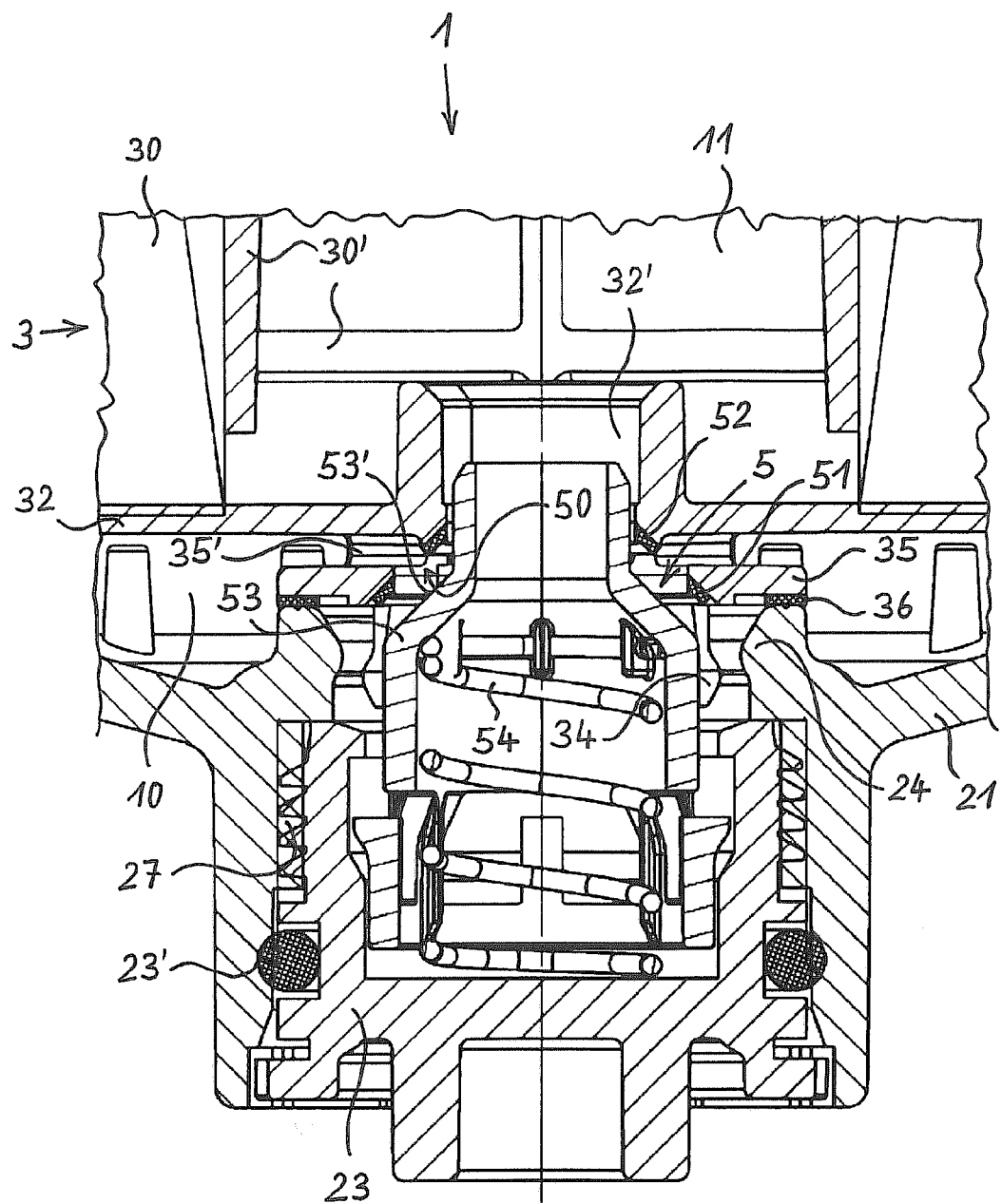
FIG. 14 shows the liquid filter according to FIG. 8 with the filter bypass valve opened, in a partial longitudinal section.

FIG. 14 shows, in an enlarged sectional representation, a detail of the liquid filter 1 according to FIG. 8 containing the filter bypass valve 5, wherein in this case the filter bypass valve 5 is opened. A small part of the filter insert 3 with the filter material element 30, the supporting grid 30' and the lower end disc 32 can be seen at the top in FIG. 14. The central part of the cover 21 with the draining screw 23 screwed into the screw-in opening 27 is located at the bottom in FIG. 14.

The aperture 32' is disposed centrally in the lower end disc 32 and is surrounded axially at the bottom, that is to say on the underside of the end disc 32, by the flange 35 with the valve seat 50 provided thereon with the two sealing contours 51 and 52. The at least one bypass channel 35' which opens radially internally between the two sealing contours 51 and 52 extends through the flange 35.

The valve body 53 which is axially movably guided in the draining screw 23 is pushed downwards, and thus away from the seal seat 50 and the sealing contours 51 and 52, against the force of the spring 54 by a liquid pressure which exceeds a threshold value or a pressure difference between the unfiltered side 10 and the filtered side which exceeds a threshold value. As a result the bypass channel 35' is opened and a direct flow connection for the liquid from the unfiltered side 10 to the filtered side 11, bypassing the filter material element 30, is enabled.

Here too a locking ring 24 is formed on the side of the cover 21 directed towards the filter insert 3 and interacts for locking with locking tabs 34 which extend downwards from the flange 35 in the axial direction. Furthermore FIG. 14 shows the seal 36 which is attached radially outside on the underside of the flange 35 and interacts in a sealing manner with the end face of the locking ring 34 of the cover 21.

Figure 15:
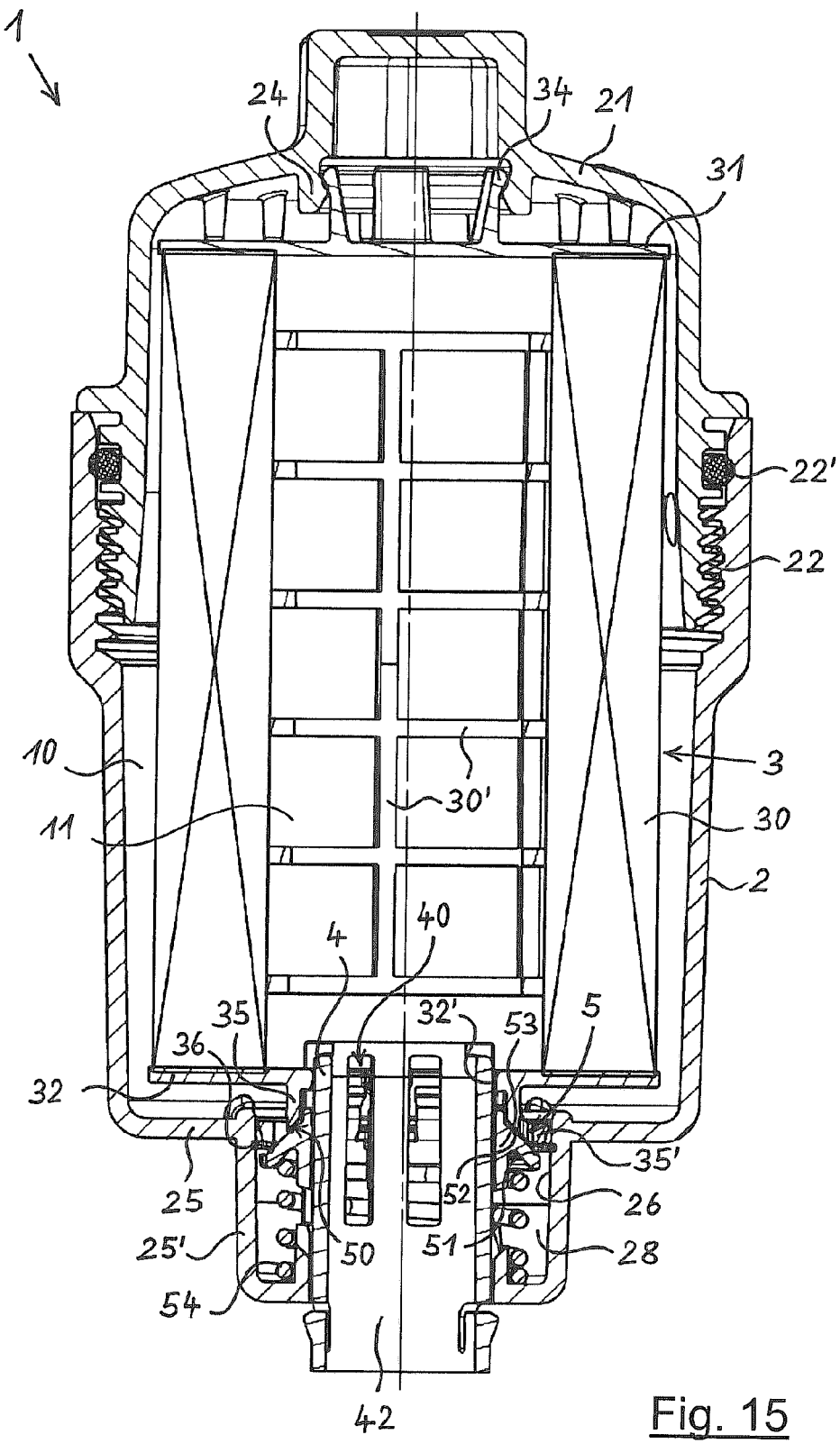
FIG. 15 shows the liquid filter with a filter bypass valve in a third embodiment, in longitudinal section.

FIG. 15 of the drawings shows a further embodiment of a liquid filter 1, in this case a standing liquid filter, likewise with a filter bypass valve 5. Here too, the liquid filter 1 has a cup-shaped filter housing 2 which is closed at the top by a screwed-on cover 21. The cover 21 can be unscrewed for example for the purpose of changing the filter insert.

At the bottom the filter housing 2 is delimited by a base 25 which has a hollow cylindrical central base part 25'. In the base part 25' is disposed a standpipe 4 which extends upwards beyond the base 25 and forms an annular gap 28 with the base part 25'.

In the interior of the filter housing 2 is disposed a filter insert 3 which again consists of a hollow cylindrical filter material element 30, a supporting grid 30' and two end discs 31 and 32. The upper end disc 31 in this case is closed and has locking tabs 34 integrally formed on its upper face which interact for locking with a locking ring 24 on the underside of the cover 21.

The lower end disc 32 is formed with a central aperture 32' surrounded by a flange 35 which extends axially downwards and outwards. With the aperture 32' the filter insert 3 is fitted onto the upper part of the standpipe 4. A valve seat 50 which is formed on the flange 35 again here comprises two concentric round sealing contours 51 and 52 which extend parallel to one another and are spaced apart from one another in the axial direction and the radial direction. At least one bypass channel 35' which opens in the region of the valve seat 50 between the sealing contours 51 and 52 again extends through the flange 35.

Below the end disc 32 and the flange 35 formed integrally therewith an annular valve body 53 is axially movably guided on the external periphery of the standpipe 4. By means of a helical spring 54, which like the valve body 53 is disposed in the annular gap 28, the valve body 53 is preloaded with a force which is preloaded in the closing direction, in this case upwards. In normal operation of the filter 1 the valve body 53 is pressed by the spring 54 in a sealing manner against the valve seat 50 with the sealing contours 51 and 52, so that the bypass channel 35' is closed.

In the example according to FIG. 15 the valve body 53 has a further function, namely that of a locking element of a mounting lock against the installation of unauthorized filter inserts. For this purpose the standpipe 4 has a latching device 40 which locks the valve body 53 against axial movement and which during installation of a filter insert can only be unlatched by matching unlatching means on an associated filter insert 3. An unauthorized filter insert which does not have the matching unlatching means cannot be installed in the filter housing 2 because the valve body 53 which simultaneously forms the locking element cannot move downwards out of an uppermost position. Thus the valve body 53 here advantageously has a double function.

Figure 16:
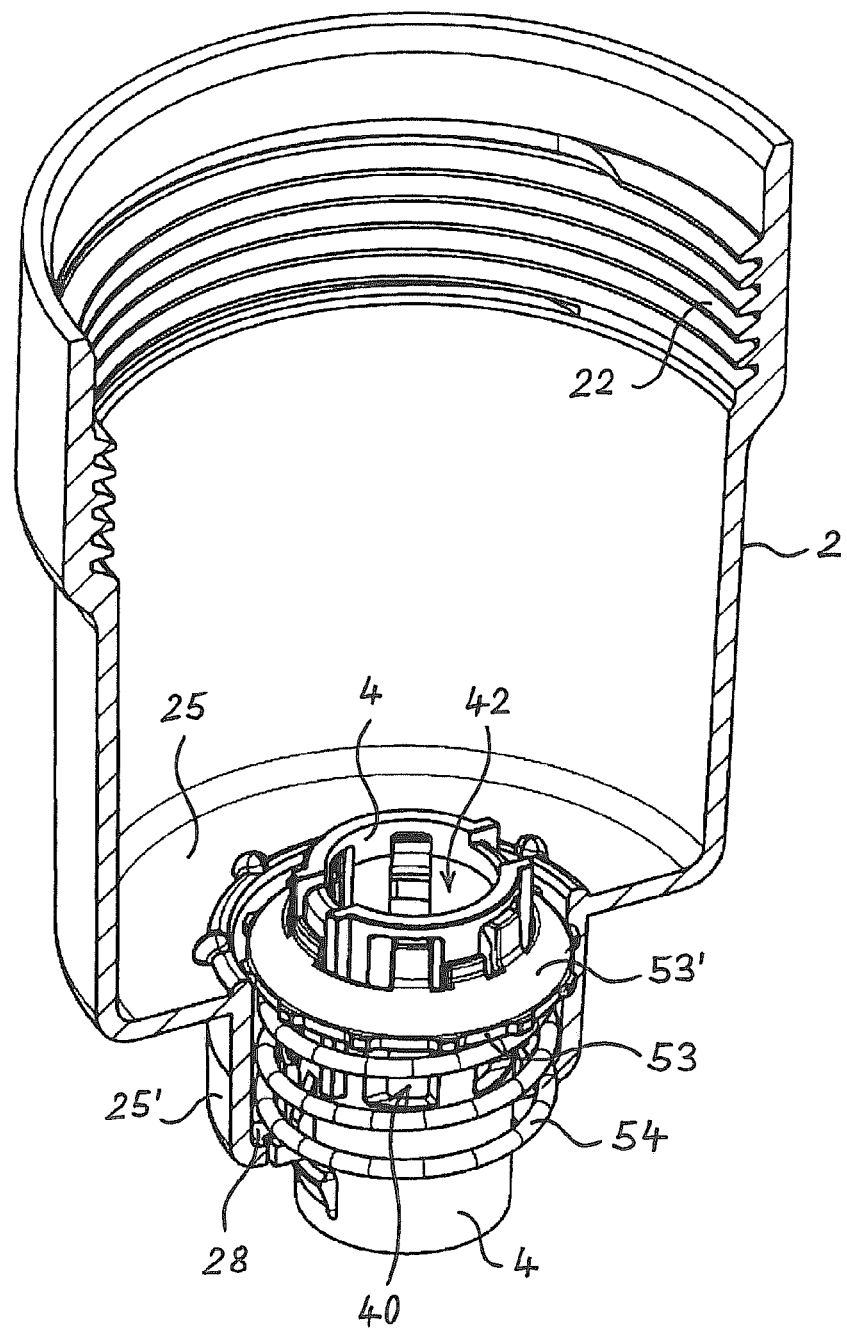
FIG. 16 shows the liquid filter according to FIG. 15 without filter insert and without cover, with the housing cut away.

In FIG. 16 the filter housing 2 is shown cut away, together with the standpipe 4 and the valve body 53 guided thereon and the associated spring 54, which are illustrated in elevation. The standpipe 4 is disposed central in the hollow cylindrical base part 25' of the base 25 of the filter housing 2 and forms the annular gap 28 with the internal periphery of the hollow cylindrical base part 25'. The annular valve body 53 with its upwardly directed sealing area 53' and below it the helical spring 54 are disposed in the annular gap 28 and guided on the standpipe 4. A liquid drainage channel 42, through which filtered liquid drains out of the filter housing 2 during operation of the filter, extends through the interior of the standpipe 4. Elements of the latching device 40 which interact with the valve body 53 are provided on the standpipe 4 and perform the function described above of locking the valve body 53 against the installation of an unauthorized filter insert.

An internal thread is visible as part of the screw connection 22 on the internal periphery of the upper part of the filter housing 2.

Figure 17:
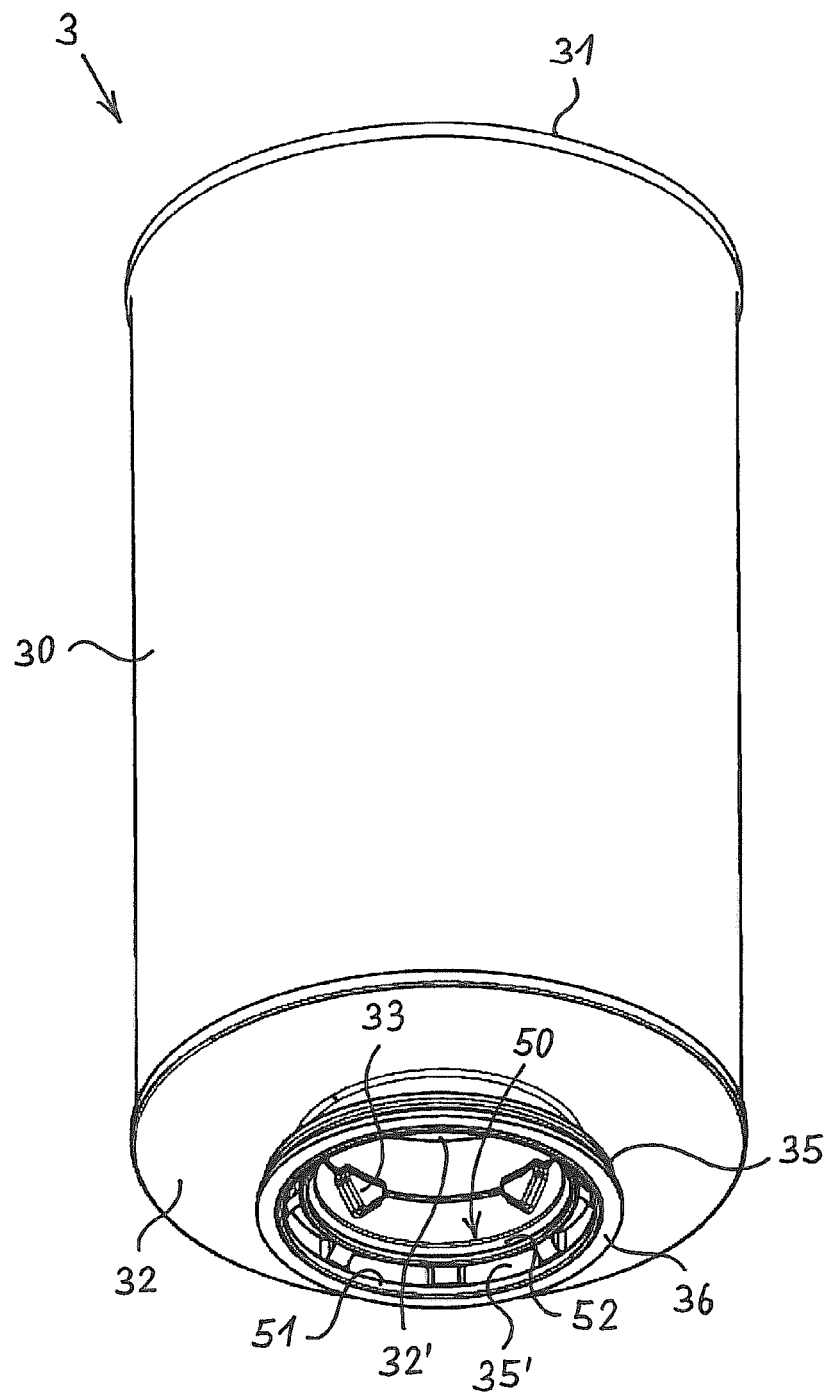
FIG. 17 shows a filter insert of the liquid filter according to FIG. 15, in elevation.

FIG. 17 shows the filter insert 3 from the liquid filter 1 according to FIG. 15 as an individual part in elevation. The greatest part of the filter insert 3 forms the filter material element 30 which is enclosed by the upper end disc 31 and the lower end disc 32. The lower end disc 32 has the central aperture 32' for fitting onto the standpipe 4. The flange 35 extends downwards from and integrally with the lower end disc 32. A plurality of bypass channels 35' extend in the radial direction through the flange 35 from the outside inwards. On the internal periphery of the flange 35 the valve seat 50 is formed with the two sealing contours 51 and 52, wherein the bypass channels 35' open between the two sealing contours 51 and 52.

A plurality of unlatching means 33 in the form of triangular lugs are disposed axially above the valve seat 50 on the internal periphery of the flange 35 or the aperture 32' and, when the filter insert 3 is fitted onto the standpipe 4 (compare FIGS. 15 and 16), unlatch the latching device 40 and thus enable movement of the valve body 53 downwards on the standpipe 4.

The seal 36 which in the installed state of the filter insert 3 separates the unfiltered side 10 from the filtered side 11 of the liquid filter 1 is disposed on the lower free edge of the flange 35.

Figure 18:
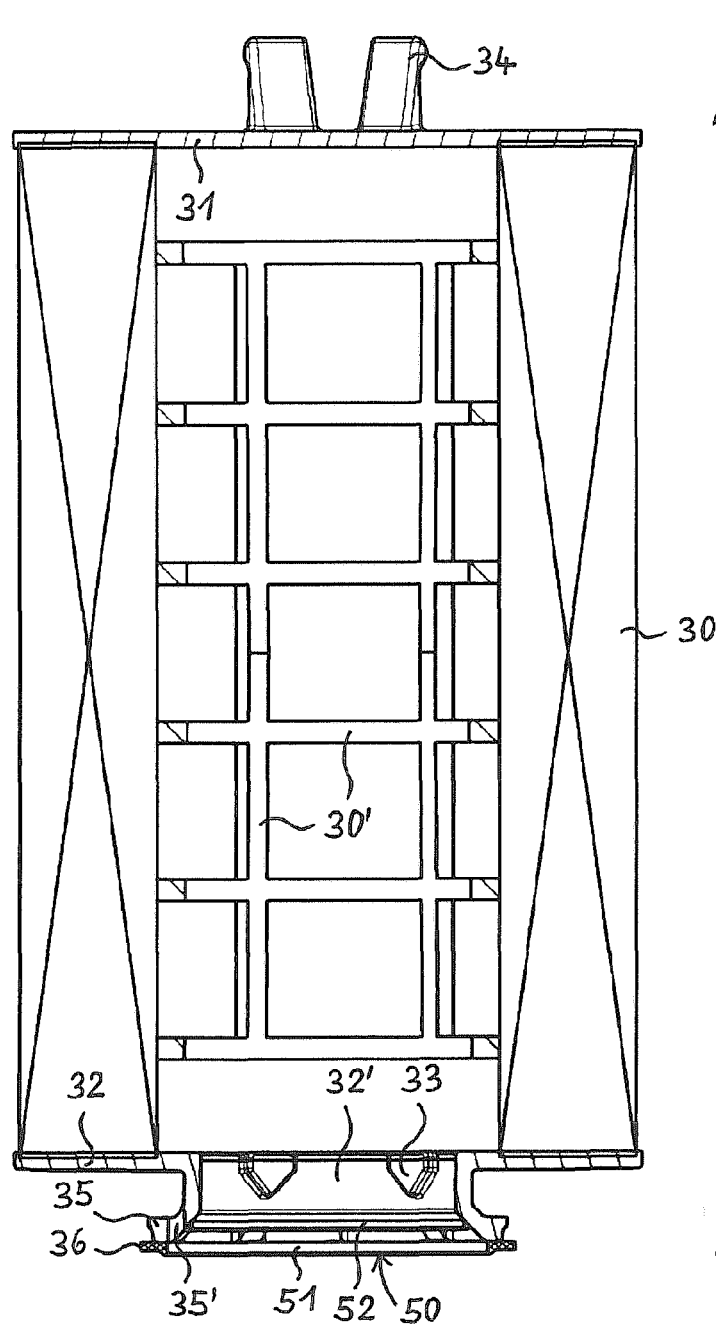
FIG. 18 shows the filter insert according to FIG. 17 in longitudinal section.

FIG. 18 shows the filter insert 1 according to FIG. 17 in a longitudinal section. The hollow cylindrical filter material element 30 and the supporting grid 30' therein are disposed between the upper end disc 31 and the lower end disc 32. The upper end disc 31 has the locking tabs 34 at the top.

The lower end disc 32 has the central aperture 32' and the flange 35 which extends downwards and outwards. The bypass channel 35' here extends in the axial direction through the flange 35. The valve seat 50 formed by the sealing contours 51 and 52 which here too extend axially and radially relative to one another is visible on the downwardly directed side of the flange 35. Here too the at least one bypass channel 35' opens between the two sealing contours 51 and 52. The seal 36 extends radially externally from the outer sealing contours 51. The unlatching means 33, each in the form of a tab having a downwardly directed tip, which project radially inwards into the aperture 32' are visible above the seal seat 50 are visible on the internal periphery of the flange 35.

Figure 19:
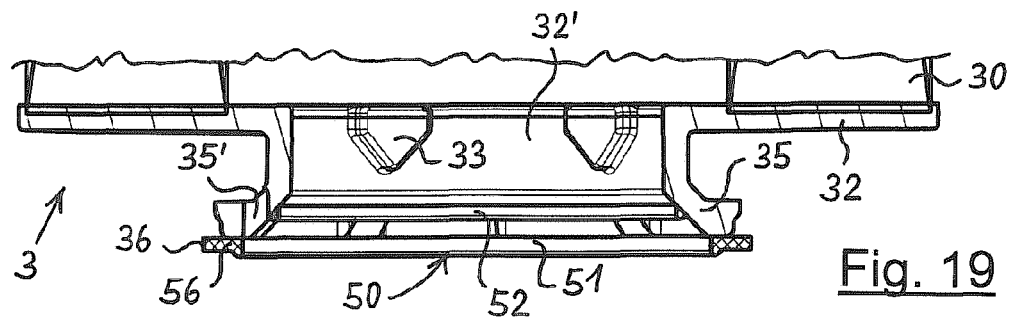
FIG. 19 shows a lower end disc of the filter insert according to FIGS. 17 and 18 in an enlarged longitudinal section.

The lower end disc 32 of the filter insert 3 is shown in an enlarged sectional representation in FIG. 19. In particular the design of the flange 35 is clear. The lug-like unlatching means 33 are formed at the top on the internal periphery of the flange 35. This is adjoined axially downwards by the inner sealing contour 52 and then the outer sealing contour 51 of the valve seat 50. The at least one bypass channel 35' which opens between the two sealing contours 51 and 52 extends through the flange 35. The radially outwardly extending sealing ring 36 which in this case is combined with the sealing contour 51 to form a sealing ring 56 adjoins the lower outer sealing contour 51.

A small part of the filter material element 30 and of the supporting grid 30' is still discernible below the end disc 32.

Figure 20:
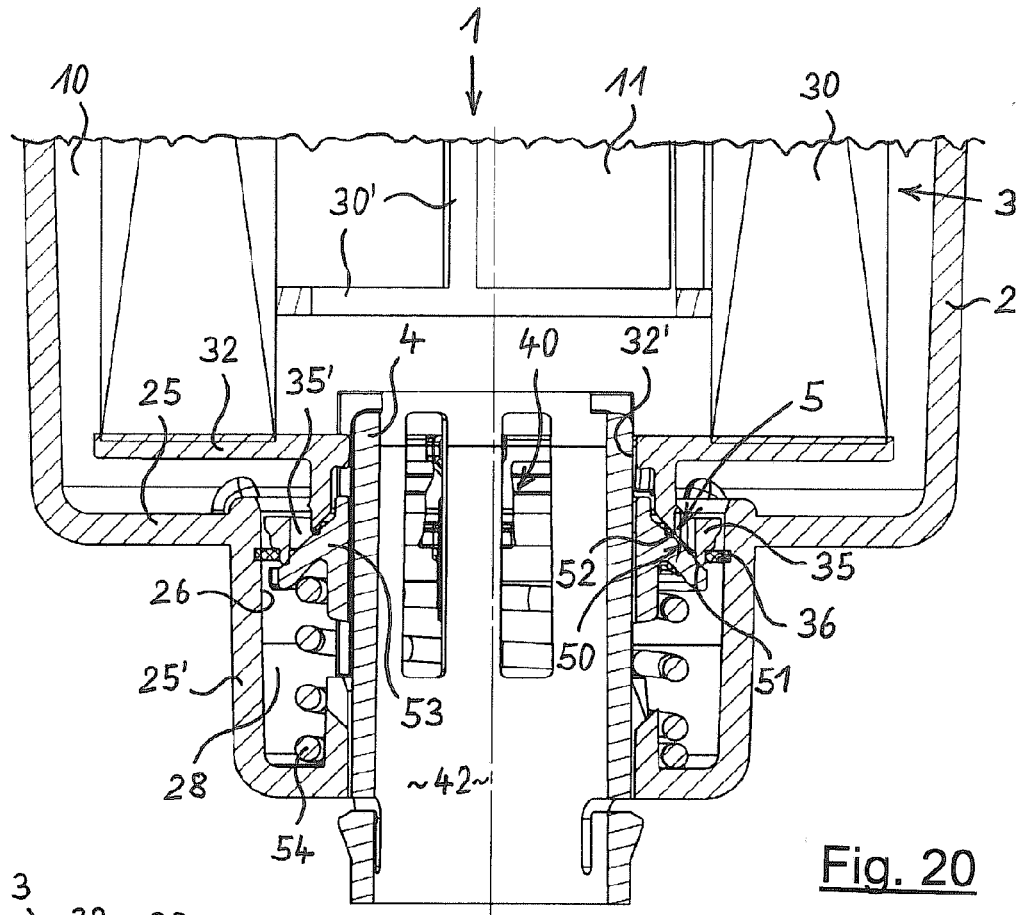
FIG. 20 shows the liquid filter according to FIG. 15 in a longitudinal section through the lower part thereof.
Figure 21:
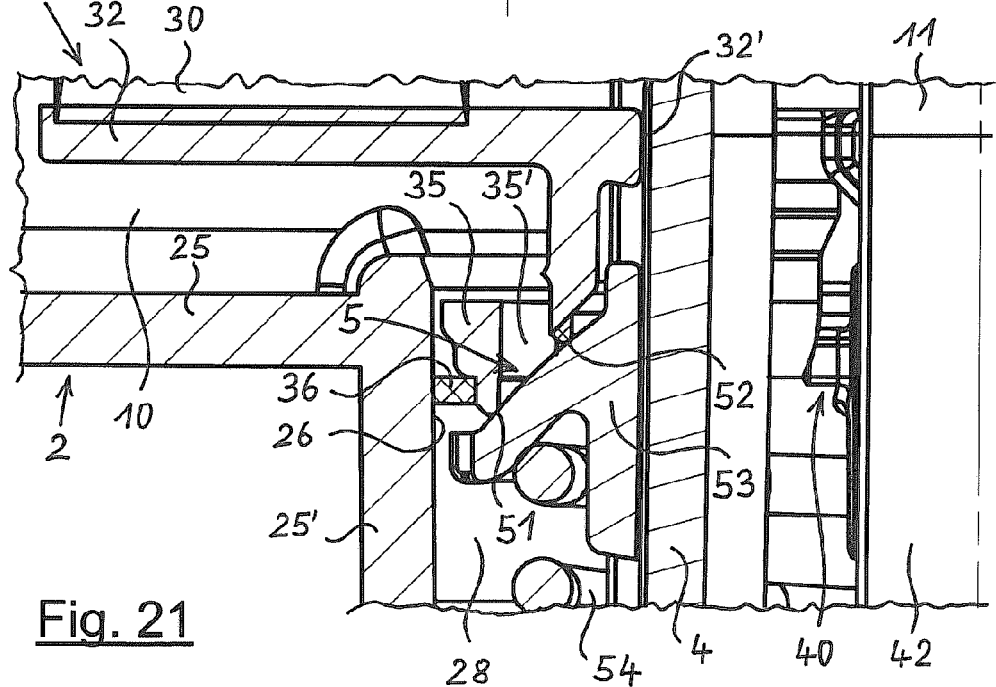
FIG. 21 shows an enlarged detail with the filter bypass valve according to FIG. 20.

In the FIGS. 20 and 21 is an example of a liquid filter 1 is shown, which differs from the previously described example with regard to the design of the sealing contours 51 and 52 of the valve seat 50 and with regard to the design of the seal 36. In its other individual parts the example according to FIGS. 20 and 21 corresponds to the previously described embodiment.

For the example according to FIGS. 20 and 21 it is characteristic that the two sealing contours 51 and 52 are implemented with different hardness. The sealing contour 51 is a hard sealing contour which is implemented in the same material with the collar 35 and the end disc 32. The sealing contour 52, on the other hand, is formed by an elastomeric ring which is attached to, preferably injection molded onto the flange 35 and is softer and more flexible than the material of the relative to the material of the flange 35 and also of the valve body 53. As a result it is ensured that in the closed position of the valve body 53 of the filter bypass valve 5 a reliable sealing contact with the two sealing contours 51 and 52 is achieved.

In this case the seal 36 which separates the unfiltered side 10 from the filtered side 11 of the liquid filter 1 is attached as a separate sealing ring to the flange 35, for example likewise injection molded or alternatively adhered or welded thereon. In the installed state of the filter insert 3 the sealing ring 36 forms a seal against the sealing surface 26 on the internal periphery of the hollow cylindrical base part 25' as a radial seal.

Figure 22:
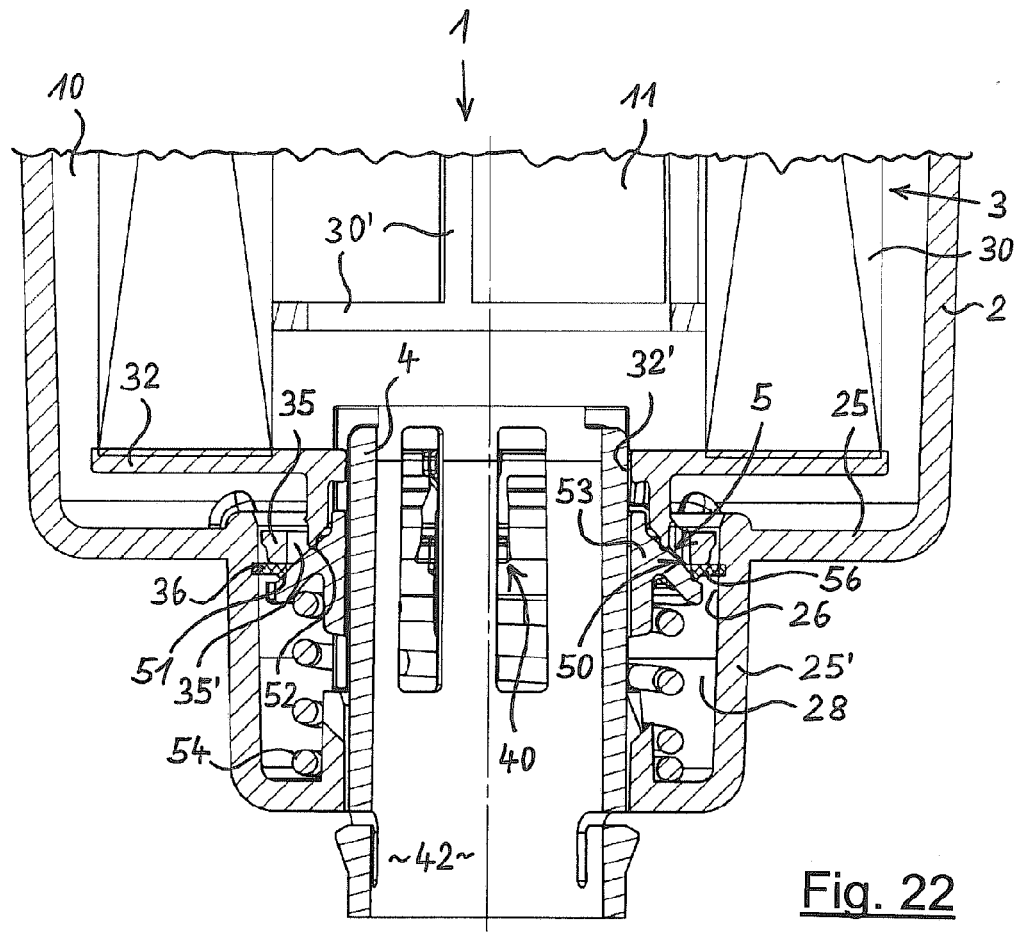
FIG. 22 shows the liquid filter according to FIG. 15 with a modified filter bypass valve, in a longitudinal section through the lower part thereof.
Figure 23:
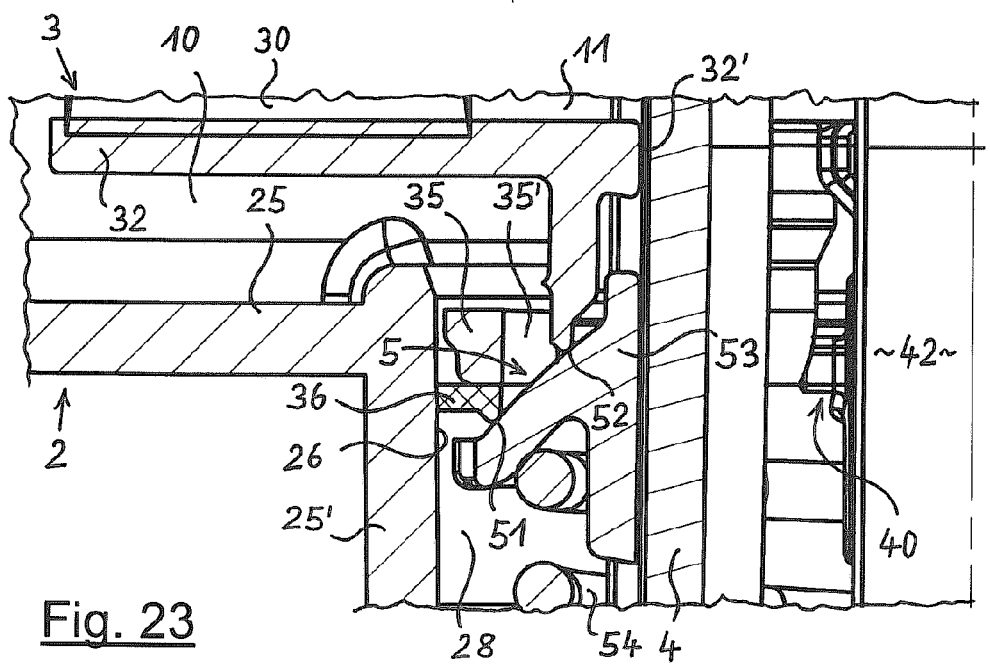
FIG. 23 shows an enlarged detail with the filter bypass valve according to FIG. 22.

FIGS. 22 and 23 each show in longitudinal section a further example of the liquid filter 1, wherein again a different embodiment of the sealing contours 51 and 52 and the seal 36 is presented.

Also in this example the sealing contours 51 and 52 are implemented with different hardness, however here the sealing contour 51 is a soft sealing contour, whilst the sealing contour 52 here is a hard sealing contour integral with the material of the flange 35.

In this case the sealing contour 51 consists of a softer and therefore flexible elastomeric ring which is attached to the underside of the flange 35, for example injection molded or adhered or welded thereon. In this case the elastomeric ring forming the sealing contour 51 is simultaneously also the seal 36 for separation of the unfiltered side 10 and the filtered side 11, so that here the sealing contour 51 and the seal 36 form a unitary integral sealing ring 56.

With regard to the further parts and reference numerals in FIGS. 22 and 23 reference is made to the preceding description.

Figure 24:
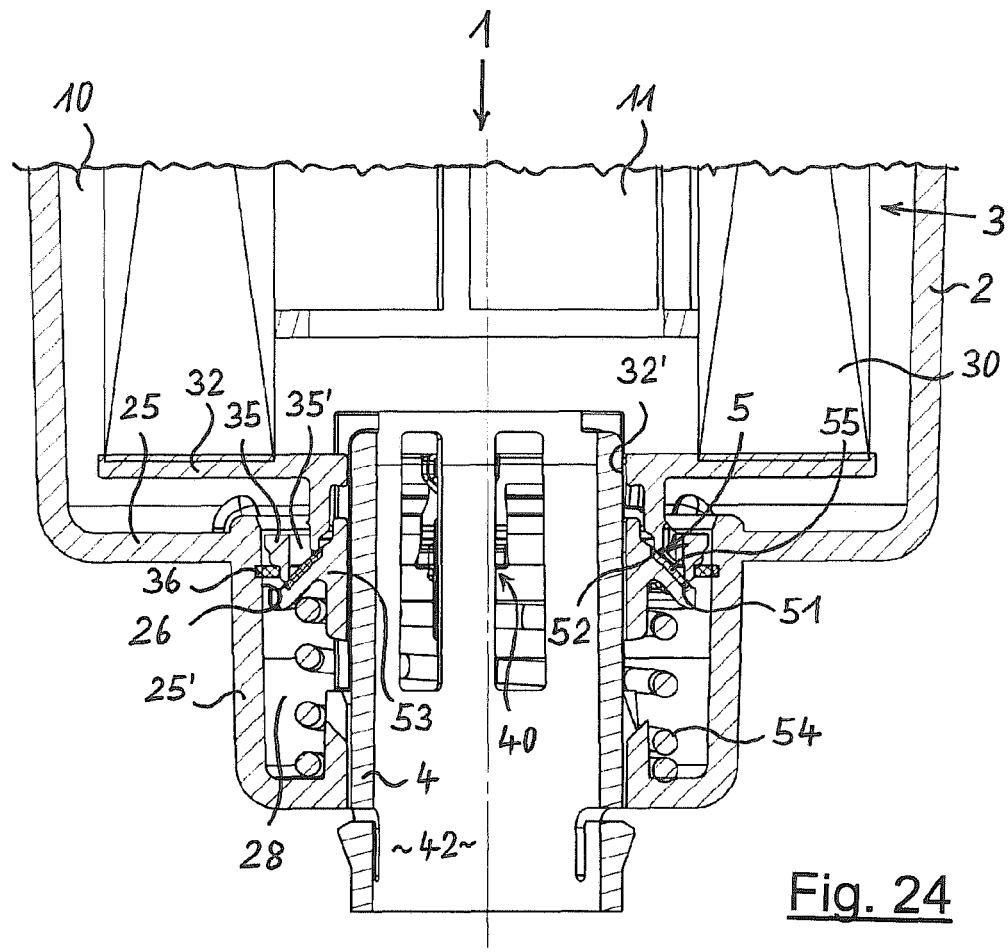
FIG. 24 shows the liquid filter according to FIG. 15 with a further modified filter bypass valve, in a longitudinal section through the lower part thereof.
Figure 25:
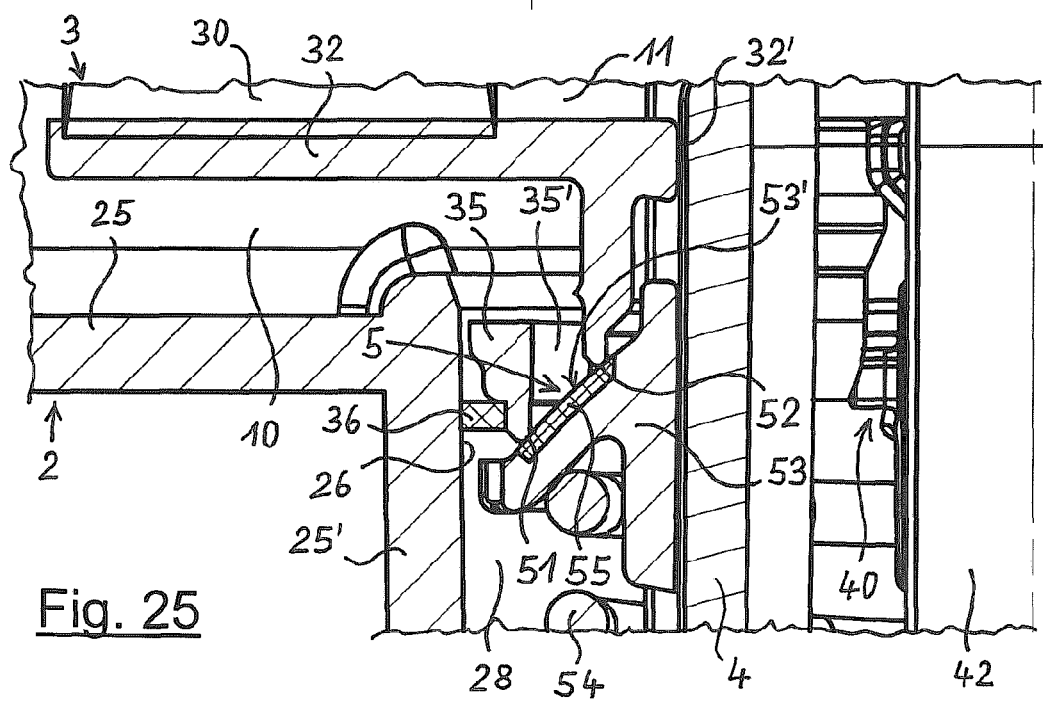
FIG. 25 shows an enlarged detail with the filter bypass valve according to FIG. 24.

FIGS. 24 and 25 show an example of the liquid filter 1 with yet another different embodiment of the sealing contours 51 and 52 of the seal seat 50. It is characteristic here that both sealing contours 51 and 52 are formed on the flange 35 from the same material as the flange, that is to say as hard sealing contours. In order nevertheless to ensure good sealing of the filter bypass valve 5 in its closed position, the valve body 53, or more precisely the sealing area 53' thereof, is provided with an elastomeric coating 55, so that the sealing area 53' overall is soft and flexible. Thus it is also ensured here that in the closed position of the valve body 53 the two sealing contours 51 and 52 interact reliably therewith in a sealing manner.

The seal 36 for separation of the unfiltered side 10 from the filtered side 11 is in this case attached radially externally to the flange 35 as a separate sealing ring. Here too the seal 36 interacts in a sealing manner as a radial seal with the sealing surface 26 formed on the internal periphery of the hollow cylindrical base part 25'.

Figure 26:
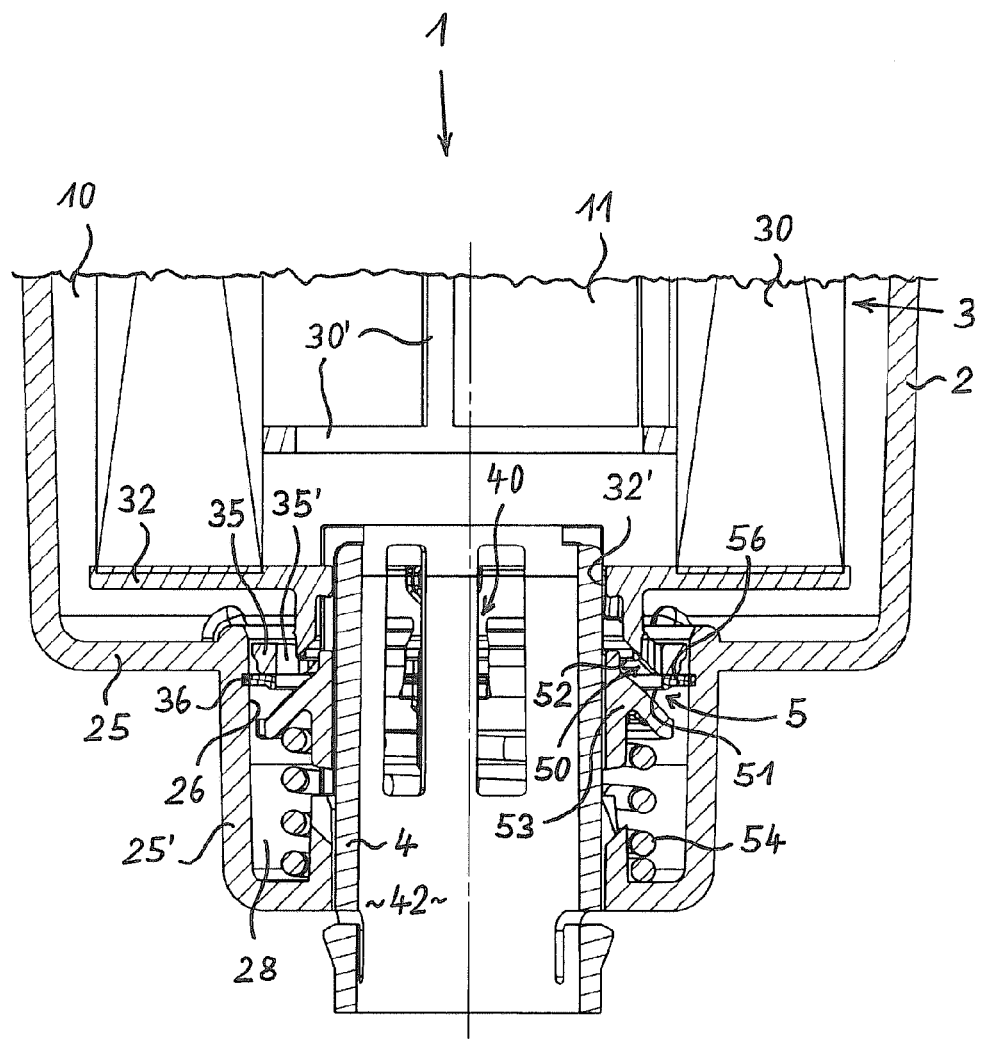
FIG. 26 shows the liquid filter according to FIG. 15 with the filter bypass valve opened, in a partial longitudinal section.

FIG. 26 shows the liquid filter 1 of the previously described type in the longitudinal section, now with the filter bypass valve 5 opened. Due to a liquid pressure difference which prevails between the unfiltered side 10 and the filtered side 11 of the filter 1 and is raised above a predeterminable threshold value, a force which exceeds the preload force of the spring 54 acts on the valve body 53. As a result the valve body 53 is moved downwards, that is to say away from the valve seat 50, against the force of the spring 54, and the bypass channel 35' in the flange 35 is opened. Thus liquid can flow from the unfiltered side 10 of the filter 1, bypassing the filter material element 30, directly to the filtered side 11. As soon as the force of the spring 54 again exceeds the force exerted by the liquid on the valve body 53, the valve body 53 returns to its closed position and shuts off the bypass channel 35'.

Figure 27:
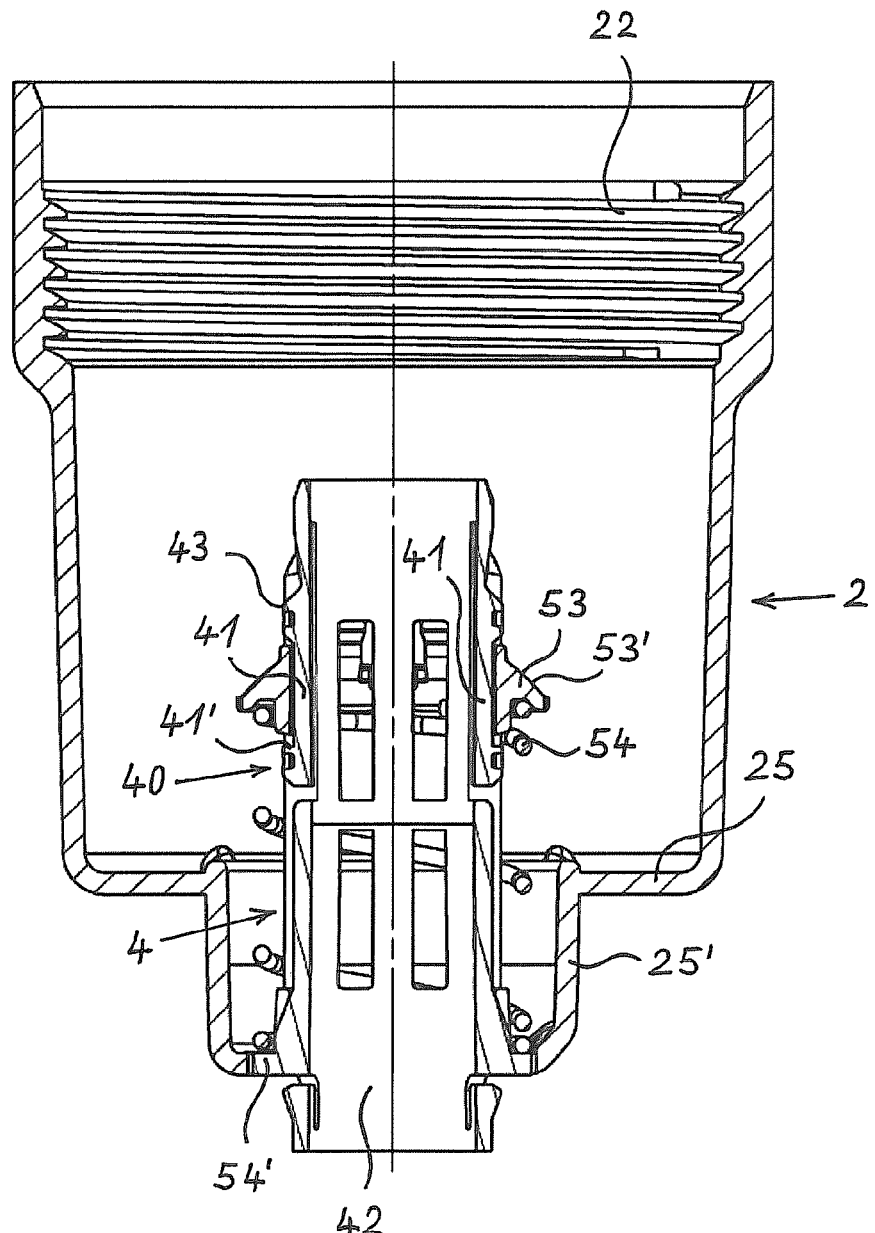
FIG. 27 shows a filter housing with a valve body of the filter bypass valve which simultaneously forms a locking element of a mounting lock, in longitudinal section.

FIG. 27 shows in longitudinal section a filter housing 2 with a valve body 53 of the filter bypass valve which simultaneously forms a locking element of a mounting lock, wherein here no filter insert is installed and no housing cover is screwed on. In this case a central standpipe 4 is connected in a sealed manner to the floor 25 of the filter housing 2 and thus forms a part of the filter housing 2. The valve body 53 of the filter bypass valve is axially movably guided on the external periphery of the standpipe 4. The valve body 53 here is moved on the standpipe 4 into its uppermost position by the force the spring 54.

The standpipe 4 has a latching device 40 which interacts with the valve body 53 which forms the locking element of the mounting lock against the installation of unauthorized filter inserts. The latching device enables an axial movement of the valve body 53 downwards on the standpipe 4 only if an associated filter insert 3 with matching unlatching means is installed.

For this purpose two resilient latching arms 41 are disposed, preferably integrally formed, symmetrically opposite one another in the upper half of the standpipe 4 and extend downwards from above in the axial direction. On the radially outwardly directed side thereof each of the latching arms 41 has a radially outwardly directed latching hook 41' on its free, lower end. As FIG. 27 illustrates, the latching hooks 41' form a locking device which prevents movement of the valve body 53 downwards when, as in FIG. 27, the latching arms 41 are located in their latching position.

At an axial spacing above the latching hook 41', an unlatching cam 43 is likewise disposed on each latching arm 41 on the radially outwardly directed side thereof. When a filter insert 3 with matching unlatching means is installed in the filter housing 2 according to FIG. 27, the latching device 40 is unlatched by means of the unlatching means acting on the unlatching cam 43, so that then by movement of the valve body 53 the filter insert 3 can be pushed downwards against the force of the spring 54 onto the standpipe 4, as is explained below with reference to FIG. 29.

Figure 28:
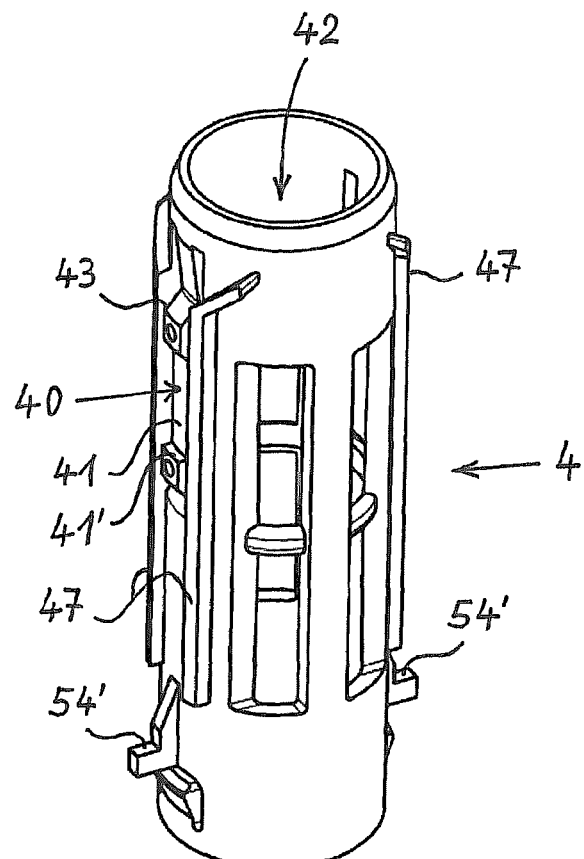
FIG. 28 shows a standpipe as part of the filter housing and the valve body according to FIG. 27, as individual parts in elevation.
Figure 28:
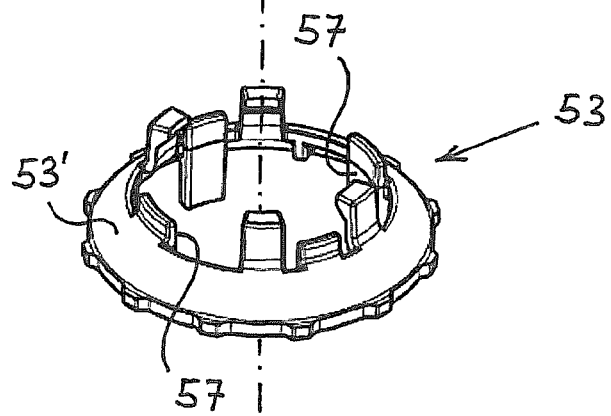

FIG. 28 shows the standpipe 4 with the latching device 40 and the valve body 53 according to FIG. 27 as individual parts in elevation. The standpipe 4 has the two latching arms 41, of which only one is visible here, symmetrically opposite one another on its periphery. On its lower end the latching arm 41 has the radially outwardly directed latching hook 41'. At an axial spacing above this the unlatching cam 43 is likewise disposed on the outer face of the latching arm 41. Viewed in the circumferential direction two axial fins, which together form an axial guide 47 of which the upper section in a funnel shape, extend on both sides of each latching arm 41. By means of this guide 47 the unlatching means are brought into an engagement-compatible position relative to the latching arms 41 and the unlatching cams 43 thereof on an associated filter insert 3 when it is installed.

A spring support 54' is disposed axially below each of the guides 47 for the spring 54 (not shown here) which preloads the valve body 53 in the closing direction, in this case in the upward direction. The hollow interior of the standpipe 4 forms the liquid drainage channel 42.

The valve body 53 is, as already explained and described earlier, of annular design and has the conical sealing area 53' on its side directed upwards in FIG. 28. On its internal periphery the valve body 53 has two guide projections 57 which interact with the guide 47. When the filter 1 is assembled first of all the associated spring 54 (cf. for example FIG. 27) is fitted onto the standpipe 4 from above and then the valve body 53 is likewise fitted onto the standpipe 4 from above and moved downwards until the guide projections 57 of the valve body 53 are moved away by means of the latching hooks 41'. Then the unlatching cams 43 block a movement of the valve body 53 back and upwards and the latching hooks 41' block a movement of the valve body 53 further downwards. Thus the standpipe 4, the spring 54 and the valve body 53 form a pre-assembled structural unit which can be simply installed in the filter housing 2.

Both the standpipe 4 and the valve body 53 guided thereon are preferably injection moldings made of plastic, in order to be able to produce them cost-effectively in large quantities. Moreover in this way the latching arms 41 can be produced without problems integrally with the other standpipe 4 whilst achieving the desired resilient characteristics.

FIG. 29 shows, again in longitudinal section, the filter housing 2 according to FIG. 27 with the installation of an associated filter insert 3 latched to a housing cover 21. A locking ring 24 on the inner face of the cover 21 and a circle of locking tabs 34 on the upper face the upper end disc 31 of the filter insert 3 serves for the releasable latching connection of the filter insert 3 to the cover 21.

Leading with its lower end disc 32 the filter insert 3 with the central aperture 32' is fitted onto the standpipe 4 and is moved downwards, wherein then on the one hand lug-like unlatching means 33 disposed on the internal periphery of the aperture 32' come into engagement with the unlatching cam 43 and on the other hand the flange 35 formed on the underside of the lower end disc 32 comes into contact on the valve body 53. The bypass channel 35' which has already been described in detail above and is not visible in the sectional plane in FIG. 29 extends through the flange 35 and the sealing contours 51 and 52 which have likewise already been described and between which the bypass channel 35' opens are also formed on the flange 35.

As the filter insert 3 is moved further downwards on the standpipe 4 the unlatching means 33 pivot the latching arms 41 of the latching device 40 inwards in the radial direction, so that the latching hooks 41' become disengaged from the valve body 53 and enable a movement of the valve body 53 and of the filter insert 3 further downwards on the standpipe 4. Thus the filter insert 3 can be introduced completely into the filter housing 2.

The lower part of the filter housing 2 is configured here for connection by insertion, e.g. to an oil module of an internal combustion engine.

Figure 29:
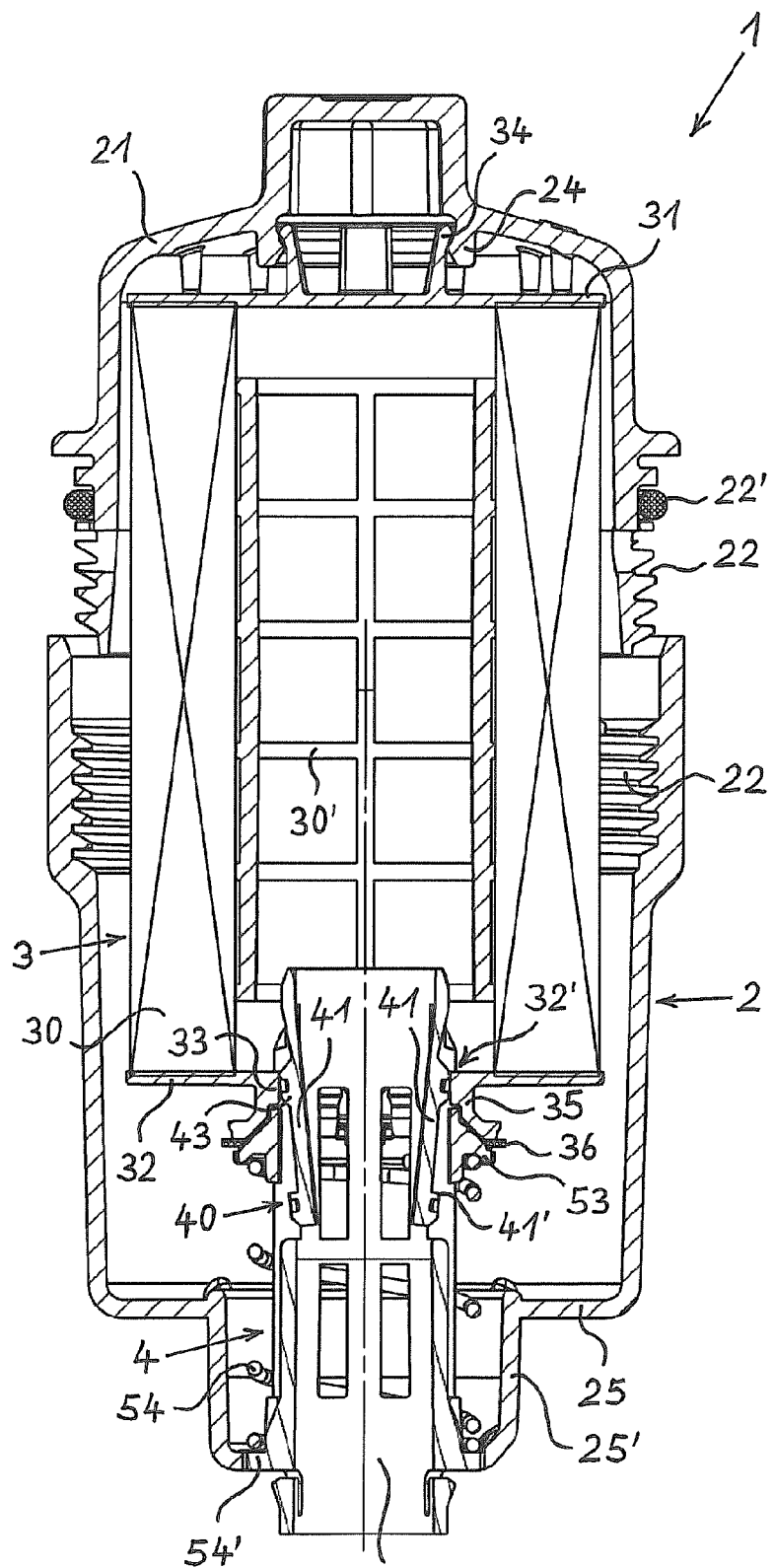
FIG. 29 shows the liquid filter with the filter housing according to FIG. 27 during installation of an associated matching filter insert, in longitudinal section.
Figure 29A:
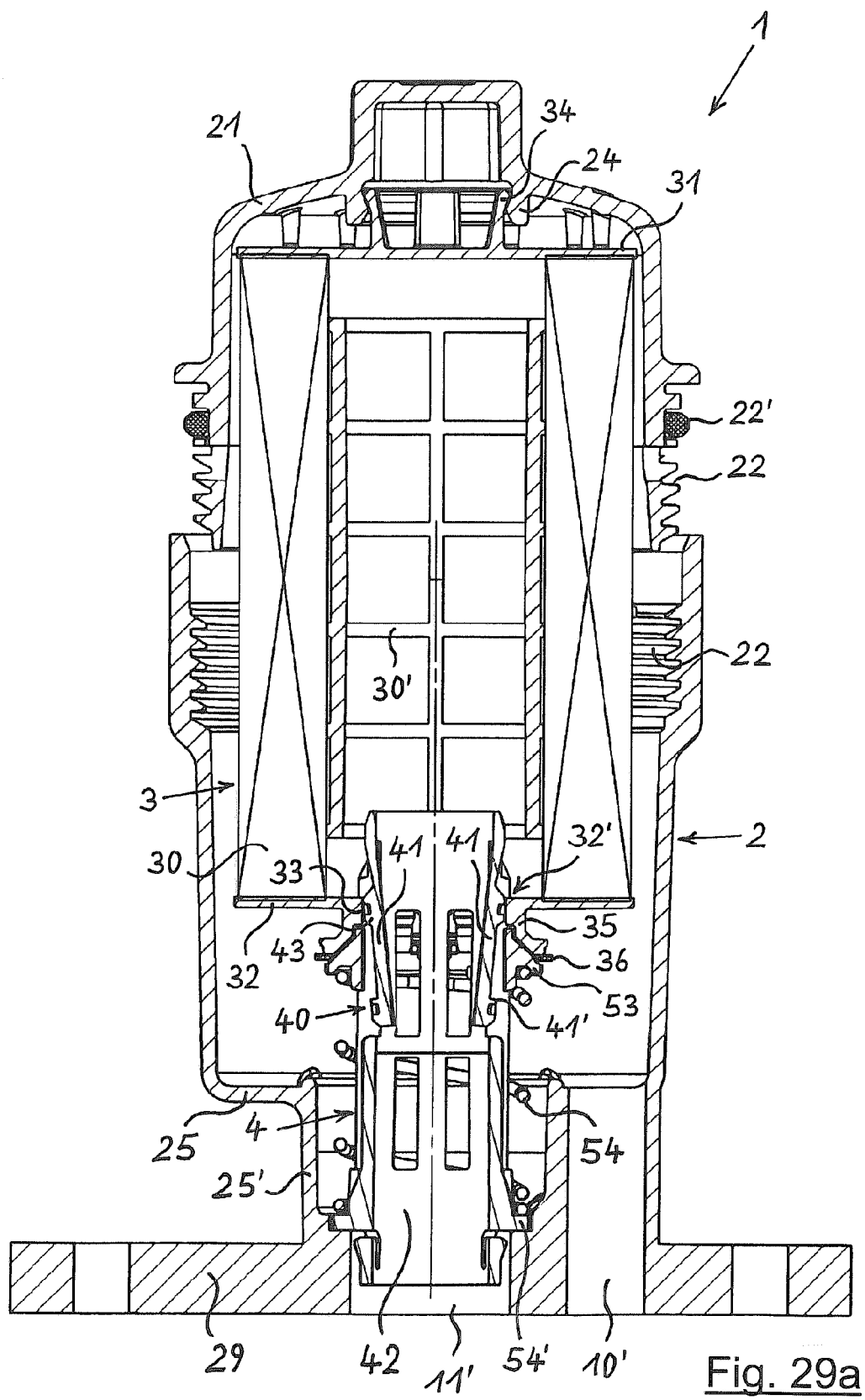
FIG. 29a shows the liquid filter with a filter housing which is modified in its lower part relative to FIG. 29, likewise during installation of an associated matching filter insert, in longitudinal section.

FIG. 29a shows, in longitudinal section, the liquid filter 1 with a filter housing 2 which is modified in its lower part relative to FIG. 29, likewise during installation of an associated matching filter insert 3. The modification of the filter housing 2 in this case consists of the lower part being designed as or with a flange 29, by means of which the liquid filter 1 can be connected to a matching flange, e.g. of an internal combustion engine (not shown here). In addition to the mechanical connection, an inlet 10' which guides liquid to be filtered to the unfiltered side 10 of the filter 1 and an outlet 11' which guides filtered liquid away from the filtered side 11 of the filter 1 are connected in terms of flow by means of the flange 29 to associated, corresponding channels in the matching flange.

In its other parts and characteristics the liquid filter 1 according to FIG. 29a corresponds to the example according to FIG. 29, and reference is made to the description of the latter.

Figure 30:
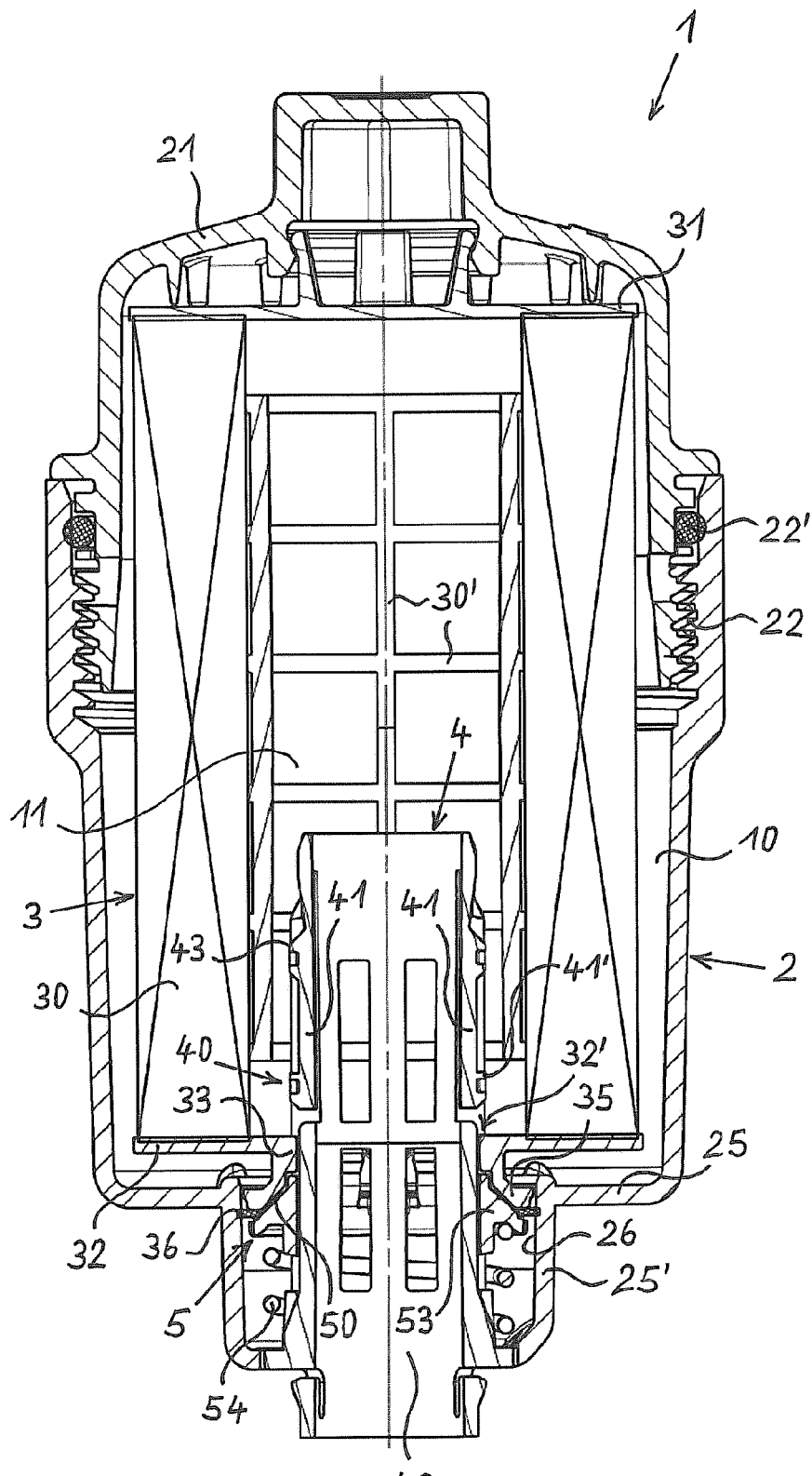
FIG. 30 shows the complete liquid filter assembled from the filter housing, the housing cover and the filter insert according to FIG. 29, in longitudinal section.

FIG. 30 shows the complete liquid filter 1 assembled from the filter housing 2, the housing cover 21 and the filter insert 3 according to FIG. 29, again in longitudinal section. The filter insert 3 with its lower end disc 32 and its flange 35 is now pushed downwards over the latching device 40 of the standpipe 4 downwards into its end position. The latching arms 41 are sprung outwards again by the inherent spring characteristic into their normal position which constitutes the latching position. At the same time the cover 21 is now screwed completely and in a sealed manner to the filter housing 2 with the seal 22' interposed. The liquid filter 1 is now ready for use.

If the pressure drop in the liquid to be filtered by means of the filter material element 30 exceeds a predeterminable threshold value, the pressure difference causes a movement of the valve body 53 downwards in the axial direction, so that the bypass channel 35' which extends through the flange 35 and is also not visible in the sectional plane in FIG. 30 is opened, as already explained above.

Figure 31:
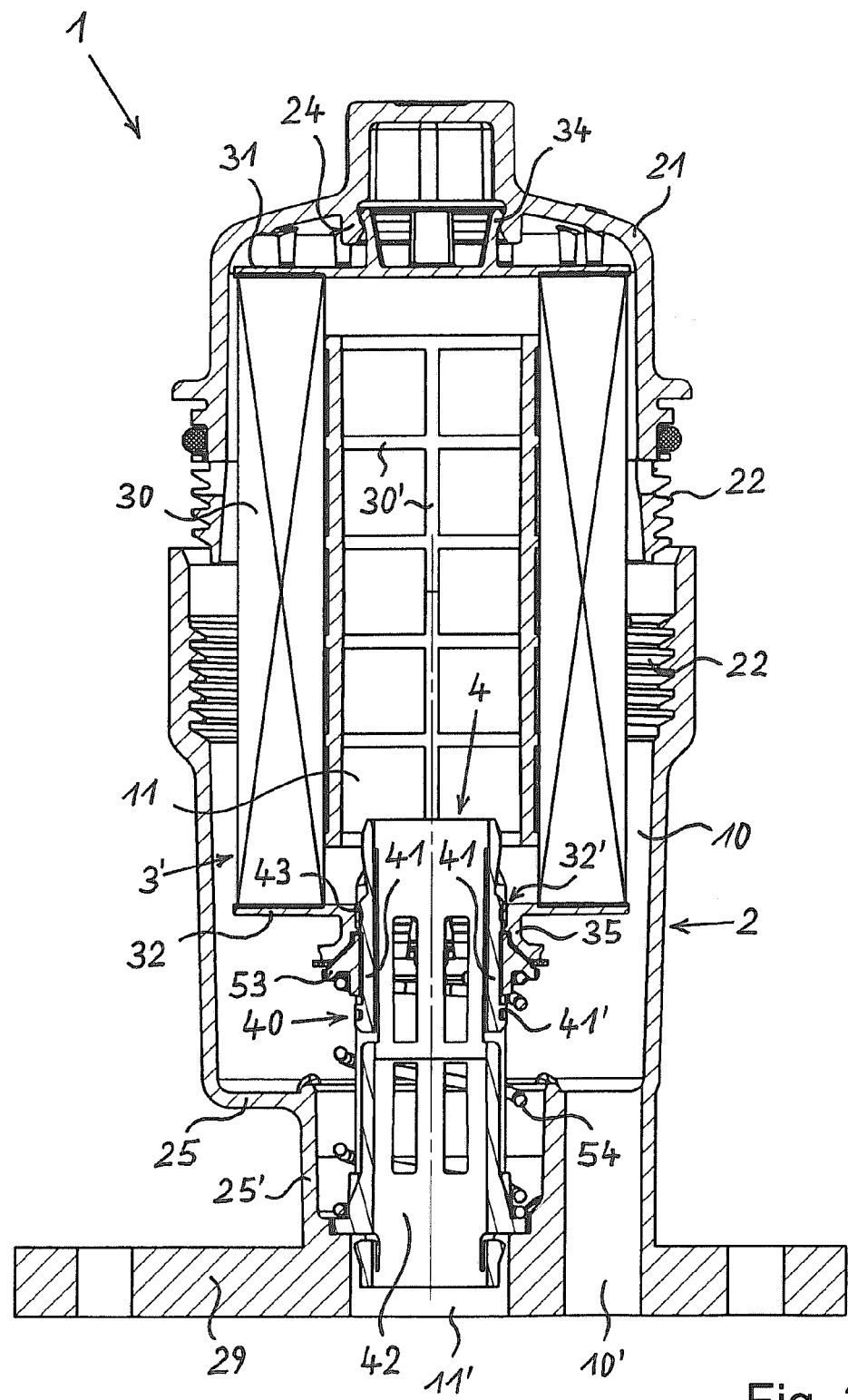
FIG. 31 shows the filter housing according to FIG. 27 during an attempt at installation of a non-matching unauthorized filter insert, in longitudinal section.

FIG. 31 shows the filter housing 2 according to FIG. 27 during an attempt at installation of a non-matching unauthorized filter insert 3', in longitudinal section. For the unauthorized filter insert 3' it is characteristic that it does not have the necessary unlatching means for unlatch the latching device

40. As a result, as shown in FIG. 31, when the unauthorized filter insert 3' is pushed onto the standpipe 4 the latching device 40 is not unlatched, because the latching arms 41 thereof with the latching hooks 41' are not pivoted inwards in the radial direction. Therefore the latching hooks 41' retain their latching position in which they block a movement of the valve body 53 downwards in the axial direction on the standpipe 4. Thus further pushing of the unauthorized filter insert 3' onto the standpipe 4 is not possible and the cover 21 cannot be connected to the filter housing 2 due to the absence of engagement of the screw connection 22. Thus operation of the liquid filter 1 with an unauthorized filter insert 3' without the matching unlatching means is prevented.

Furthermore FIG. 31 shows, regardless of the embodiment of the valve body 53 as a locking element, that the liquid filter 1 can have a flange 29, e.g. on its underside, in order to connect the filter 1 quickly and simply to, for example, an associated internal combustion engine. In this case an inlet 10' and an outlet 11' extend through the flange 29 in order to produce the necessary flow connections. Liquid to be filtered, for example lubricating oil of an associated internal combustion engine, passes through the inlet 10' to the unfiltered side 10 of the filter 1. From there the liquid to be filtered flows through the filter material element 30 of the filter insert 3, wherein particles of dirt contained in the liquid are retained. The filtered liquid then flows from the filtered side 11 of the filter 1 through the central liquid drainage channel 42 extending through the standpipe 4 into the outlet 11' in the flange 29 and through this back to the associated internal combustion engine, in particular in the oil sump. The flange 29 can be mounted by means of bolts with a seal interposed on a suitable matching flange of an internal combustion engine.

Alternatively the liquid filter 1 can also be connected in terms of flow by means of external conduits to an internal combustion engine or it may also be part of a module which comprises further components and can be pre-assembled and then connected for example to an internal combustion engine. For integration of the liquid filter into a module the filter housing 2 of the liquid filter 1 can for example be cast onto the housing of the module.

In the previously described embodiments the flange 35, in which the valve seat 50 and the at least one bypass channel 35' are formed, is designed integrally with the upper end disc 31 or with the lower end disc 32 of the filter insert 3.

Figure 33:
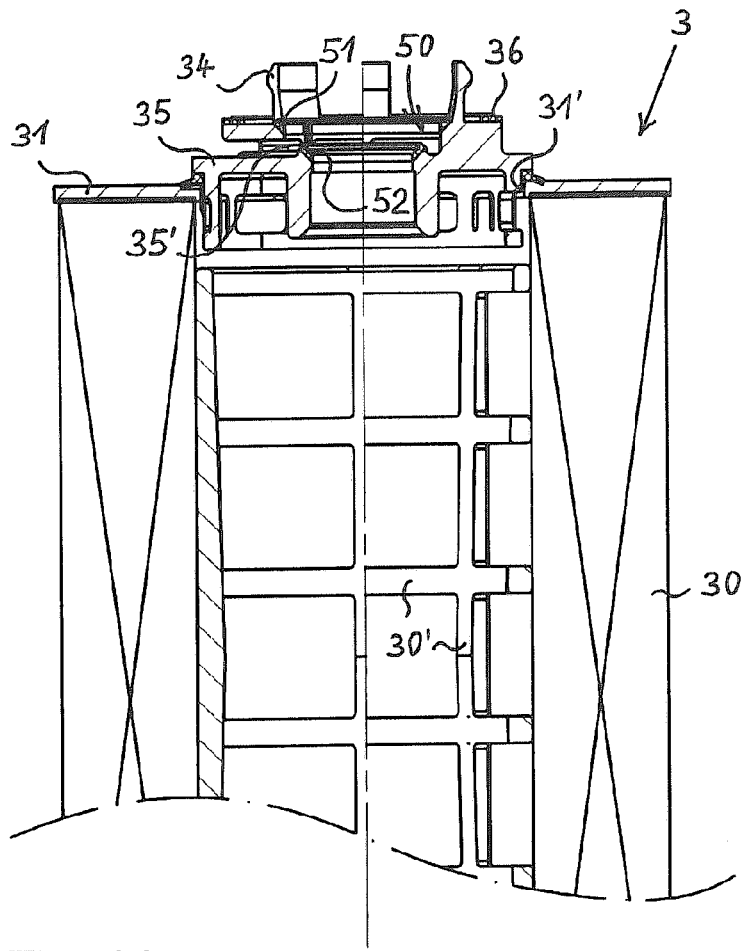
FIG. 33 shows the flange according to FIG. 32 in the state where it is joined to a filter insert, in longitudinal section.
Figure 32:
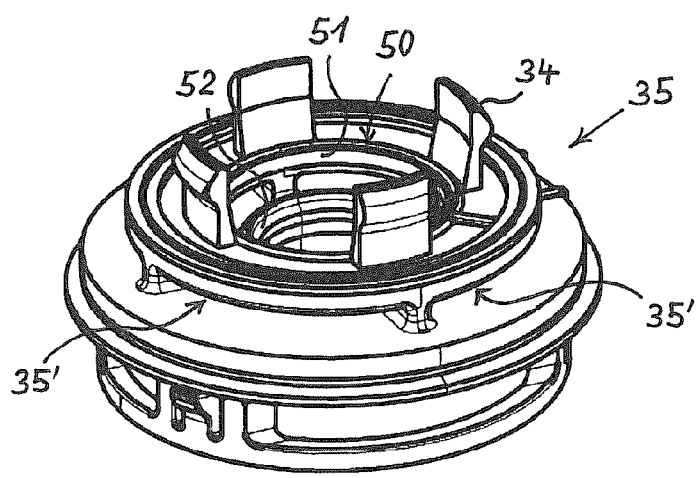
FIG. 32 shows a flange, constructed as a separate component, with a valve seat for the filter bypass valve, in elevation.

Alternatively the flange 35 may also be a separate individual part, as shown in FIGS. 32 and 33.

FIG. 32 shows first of all in a perspective view the flange 35 which has on its upper face the valve seat 50 with the two concentric sealing contours 51 and 52 spaced apart from one another in the radial direction and the axial direction. A plurality of bypass channels 35', in this case four bypass channels 35', which open radially internally between the sealing contours 51 and 52 extend inwards in the radial direction from the outside through the flange 35. On its underside the flange 35 has an annular latching element to which the flange 35 with an associated filter insert 3 can be connected.

FIG. 33 shows in longitudinal section a filter insert 3 with the flange 35 associated therewith according to FIG. 32. The filter insert 3 again consists of a hollow cylindrical filter material element 30 and a supporting grid 30' as well as two end discs, of which only the upper end disc 31 is visible here. The end disc 31 has a central aperture 31', into which the flange 35 according to FIG. 32 is inserted from above for locking and is sealed by means of a sealing ring.

In the interior of the flange 35 one of the bypass channels 35' is visible which extends inwards from outside in the radial direction and opens radially internally between the two sealing contours 51 and 52. At the top the flange 35 has the locking tabs 34, which serve for latching the filter insert 3 to the cover of the filter housing (not shown here). Moreover the flange 35 has on upwardly directed side the seal 36 which in the installed state of the filter insert 3 separates an unfiltered side 10 and a filtered side 11 of the liquid filter 1 from one another.

When the flange 35 is attached to the filter insert 3, the filter insert 3 has the same characteristics as for example the filter insert according to FIG. 5.

Figure 34:
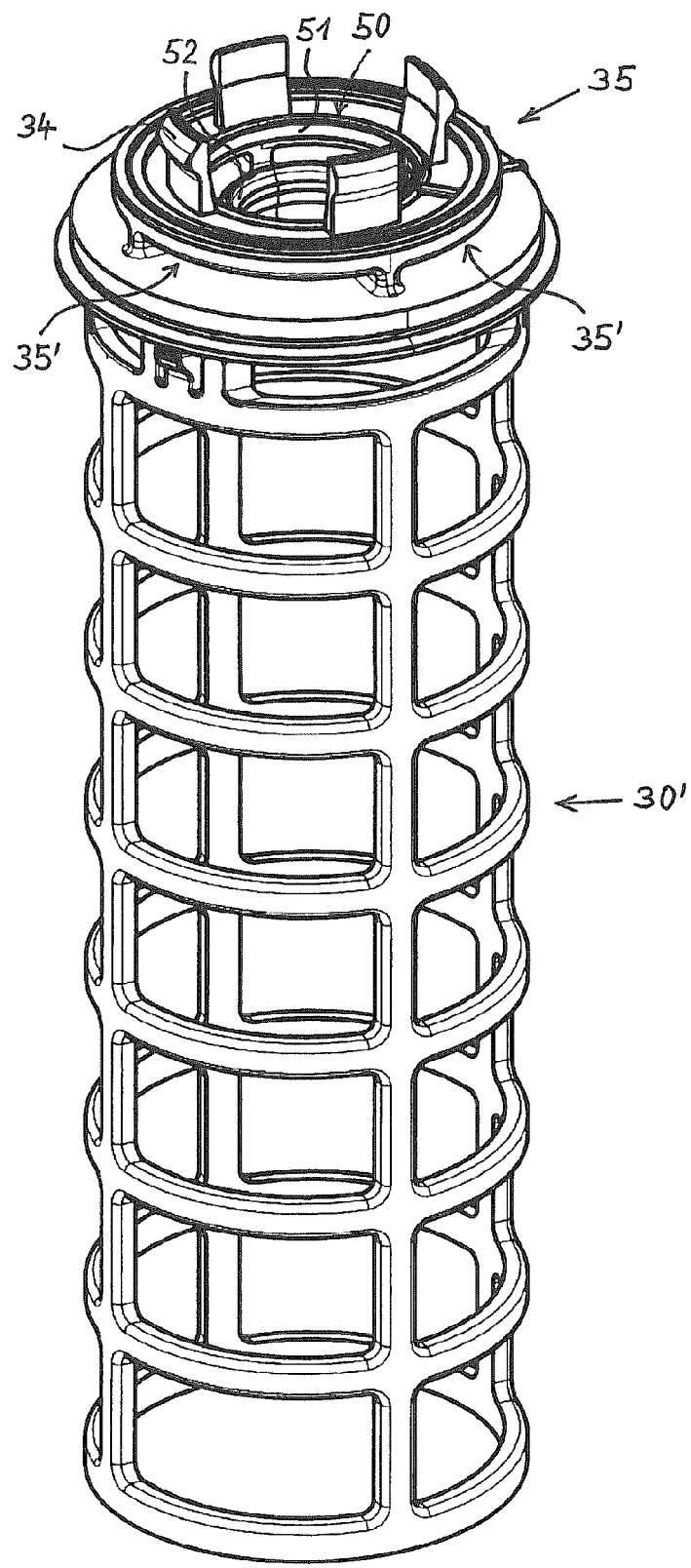
FIG. 34 shows a flange with a valve seat for the filter bypass valve together with a supporting grid designed integrally therewith, in elevation.
Figure 35:
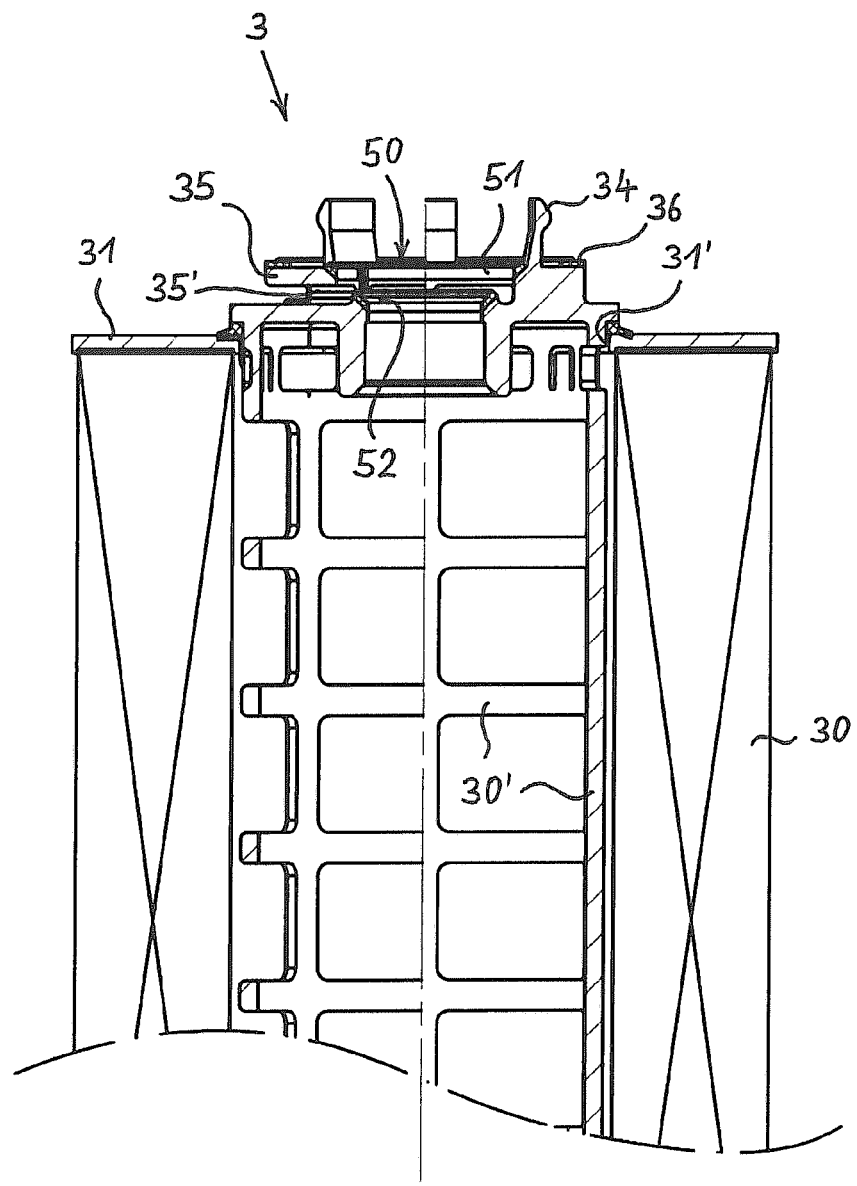
FIG. 35 shows the flange and the supporting grid according to FIG. 34 in the state where it is joined to a filter insert, in longitudinal section.

An alternative in which the flange 35 is combined with the supporting grid 30' to form an integral component is shown in FIGS. 34 and 35.

FIG. 34 shows first of all in perspective view the component consisting of the supporting grid 30' and the flange 35. In its geometric design the flange 35 in FIG. 34 corresponds to the flange according to FIG. 32, and reference is made to the description of the latter.

In FIG. 35 a filter insert 3 is shown which is provided with the component consisting of the supporting grid 30' and the flange 35. Here too the component consisting of the supporting grid 30' and the flange 35 is inserted from above through the central aperture 31' of the upper end disc 31 into the interior of the filter material element 30, wherein the flange 35 comes to rest axially above the end disc 31. By means of suitable latching means and a circumferential seal the flange 35 is mechanically connected to the upper end disc 31 and sealed against this.

One of the bypass channels 35' extending inwardly from outside in the radial direction can be seen in the left-hand part of the flange 35. The valve seat 50 with the two concentric sealing contours 51 and 52 between which the bypass channels 35' open rests on top of the flange 35. Finally the locking tabs 34 and the seal 36 are also disposed on the upwardly directed side of the flange 35.

Figure 36:
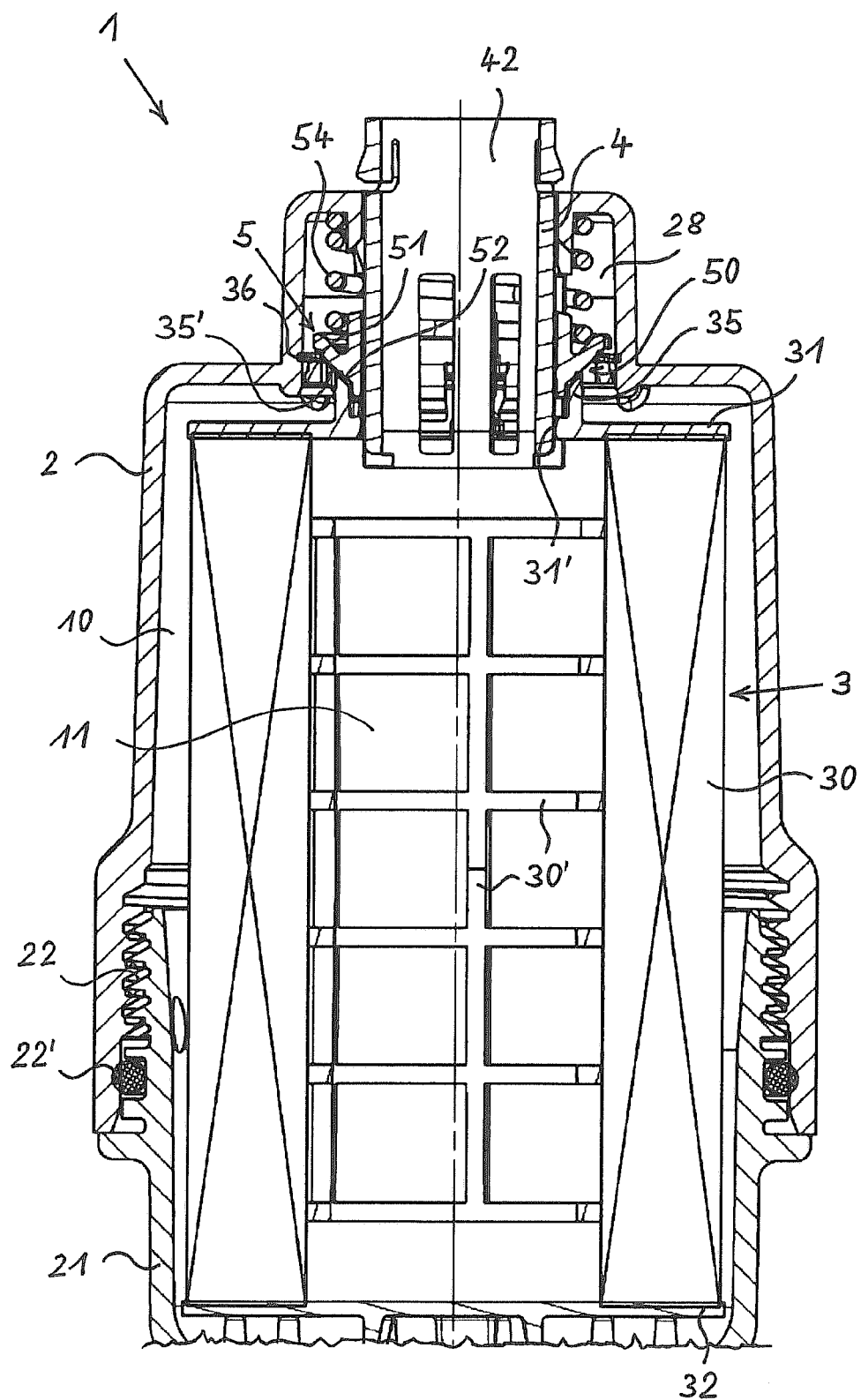
FIG. 36 shows the liquid filter with a filter bypass valve in a further final embodiment, in longitudinal section.

FIG. 36 shows the liquid filter 1 with a filter bypass valve 5 in a further final embodiment, in longitudinal section. The liquid filter 1 here is a suspended filter 1 and has an inverted cup-shaped filter housing 2 which is closed at the bottom by a screwed-on cover 21. The cover 21 can be unscrewed for example for the purpose of changing the filter insert. In order to be able to empty the filter housing 2 of liquid before the cover 21 is unscrewed, the cover 21 can have a draining screw (which is not visible in FIG. 36), as shown for example in FIG. 9, but without a filter bypass valve 5 in the draining screw, since this is disposed at the top in the filter housing 2 in this case.

Towards the top the filter housing 2 is delimited by a hollow cylindrical central housing part of reducing diameter, in which is disposed a standpipe 4 which forms an annular gap 28 with the hollow cylindrical central housing part and extends downwards somewhat out of the annular gap 28. The liquid drainage channel 42 extends through the interior of the standpipe 4.

In the interior of the filter housing 2 is disposed a filter insert 3 which again consists of a hollow cylindrical filter material element 30, a supporting grid 30' and two end discs 31 and 32. The lower end disc 32 is closed in this case. The end disc 32 can have locking tabs integrally formed on its underside which interact for locking with a locking ring 24 on the upper face of the cover 21, as already described above in relation to other embodiments.

The upper end disc 31 is formed with a central aperture 31' surrounded by a flange 35 which extends axially upwards and outwards. With the aperture 31' the filter insert 3 is fitted onto the lower part of the standpipe 4 from below. A valve seat 50 which is formed on the flange 35 again here comprises two concentric round sealing contours 51 and 52 which extend parallel to one another and are spaced apart from one another in the axial direction and the radial direction. At least one bypass channel 35' which opens in the region of the valve seat 50 between the sealing contours 51 and 52 again extends through the flange 35.

Above the end disc 31 and the flange 35 formed integrally therewith an annular valve body 53 is axially movably guided on the external periphery of the standpipe 4. By means of a helical spring 54, which like the valve body 53 is disposed in the annular gap 28, the valve body 53 is acted upon by a force which is preloaded in the closing direction, in this case downwards. In normal operation of the filter 1 the valve body 53 is pressed by the spring 54 in a sealing manner against the valve seat 50 with the sealing contours 51 and 52, so that the bypass channel 35' is closed. If a pressure difference between the unfiltered side 10 and the filtered side 11 of the filter 1 exceeds a predeterminable value, then the filter bypass valve 5 opens and a direct flow connection is created between the unfiltered side 10 and the filtered side 11 of the filter 1, bypassing the filter material element 30.

Also in the example according to FIG. 36 the valve body 53 can additionally have the function of a locking element of a mounting lock against the installation of unauthorized filter inserts.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMERALS

Reference Designation
1 liquid filter
10 unfiltered side
10' inlet
11 filtered side
11' outlet
2 filter housing
21 cover
22 screw connection
22' seal in 22
23 draining and/or ventilating screw
23' seal on 23
24 locking ring on 21
25 base of 2
25' hollow cylindrical base part
26 sealing surface in 25'
27 screw-in opening in 21 for 23
28 annular gap
29 flange
3 filter insert
30 filter material element
30' supporting grid in 30
31 first (upper) end disc
31' central aperture in 31
32 second (lower) end disc
32' central aperture in 32
33 unlatching means (lugs)
34 locking tabs on 31
35 flange on 31, 32
35' bypass channel
36 seal on 35 between 10 and 11
4 standpipe
40 latching device
41 latching arms
41' latching hook
42 liquid drainage channel in 4
43 unlatching cam
47 guides
5 filter bypass valve
50 valve seat
51, 52 sealing contours (outer, inner)
53 valve body
53' sealing area on 53
54 spring
54' spring support
55 elastomeric coating on 53
56 combined sealing ring
57 guide projection

The invention claimed is:

1. A liquid filter comprising:
a housing having a removable cover,
an inlet for liquid to be filtered which opens into an unfiltered side of the liquid filter,
an outlet for filtered liquid which starts from a filtered side of the liquid filter,
a replaceable filter insert which separates the unfiltered side and the filtered side from one another and which comprises a hollow cylindrical filter material element having a central axis and enclosed at the end faces by two end discs,
a filter bypass valve, comprising a valve seat arranged on the filter insert and a valve body which interacts with the valve seat and is acted upon by a preload force in the closing direction,
two closed sealing contours, arranged one inside the other as viewed in the radial direction, provided between the valve seat and the valve body,
at least one bypass channel, which connects the unfiltered side and the filtered side of the liquid filter while bypassing the filter material element, passing through the valve seat between the sealing contours,
the valve body being movably guided in the filter housing on a filter housing part,
the two sealing contours being offset from each other in the axial direction, and
the valve body having a shape in the sealing area of the valve body that interacts with the sealing contours that is one of conical, tapered and dome-like.

2. The liquid filter as claimed in claim 1, wherein the filter is a standing filter, wherein the valve seat is disposed on one of the end discs of the filter insert which is at the top in the installed state, and wherein the valve body is guided in the cover which closes the filter housing at the top.

3. The liquid filter as claimed in claim 1, wherein the filter is a standing filter, wherein the valve seat is disposed on one of the end discs of the filter insert which is at the top in the installed state, and wherein the valve body is guided at the top on a standpipe which extends in or through the filter insert and is one of (i) connected to the filter housing and (ii) integral therewith.

4. The liquid filter as claimed in claim 1, wherein the filter is a standing filter, wherein the valve seat is disposed on one of the end discs of the filter insert which is at the bottom in the installed state, and wherein the valve body is guided at the bottom on a standpipe which extends in or through the filter insert and is one of (i) connected to the filter housing and (ii) integral therewith.

5. The liquid filter as claimed in claim 1, wherein the filter is a standing filter, wherein the valve seat is disposed on one of the end discs of the filter insert which is at the bottom in the installed state, and wherein the valve body is guided in the cover which closes the filter housing at the bottom.

6. The liquid filter as claimed in claim 1, wherein the filter is a standing filter, wherein the valve seat is disposed on one of the end discs of the filter insert which is at the top in the installed state, and wherein the valve body is guided in the filter housing above the filter insert.

7. The liquid filter as claimed in claim 1, wherein the filter is a standing filter, wherein the cover has at least one of a central draining screw and a central ventilating screw and wherein the valve body is guided in the at least one of the central draining screw and the central ventilating screw.

8. The liquid filter as claimed in claim 1, wherein the two sealing contours are round and disposed concentrically to one another.

9. The liquid filter as claimed in claim 1, wherein at least one of the two sealing contours is one of constructed from an elastomer and has an elastomeric coating.

10. The liquid filter as claimed in claim 1, wherein the two sealing contours each have a different hardness than the other.

11. The liquid filter as claimed in claim 1, wherein the two sealing contours are at least one of integrally molded onto the associated end disc, integrally molded onto the valve body, injection molded onto the associated end disc and injection molded onto the valve body.

12. The liquid filter as claimed in claim 1, wherein a seal separating the unfiltered side and the filtered side of the liquid filter from one another is disposed between the filter housing and the filter insert on the same end disc of the filter insert as the sealing contours of the filter bypass valve.

13. The liquid filter as claimed in claim 12, wherein the seal between the unfiltered side and the filtered side is combined with at least one of the sealing contours to produce a sealing ring.

14. The liquid filter as claimed in claim 1, wherein the valve seat of the filter bypass valve is disposed on one of the end discs and wherein the filter insert has an axially and obliquely radially outwardly extending flange, of which an axially outwardly directed side forms the valve seat with the two sealing contours, and wherein the at least one bypass channel extends through the flange between the sealing contours.

15. The liquid filter as claimed in claim 14, wherein the flange is one of (i) constructed integrally with the associated end disc and (ii) manufactured as a separate component and connected, by one of welding, bonding, clipping and latching, to the associated end disc, and which comprises a supporting grid for the filter material element of the filter insert.

16. The filter insert for a liquid filter as claimed in claim 1, wherein the valve seat of the filter bypass valve is disposed on one of the end discs and wherein the filter insert is constructed without a valve body.

17. The filter as claimed in claim 16, wherein the two sealing contours are round and disposed concentrically to one another.

18. The filter insert as claimed in claim 16, wherein at least one of the two sealing contours is one of constructed from an elastomer and has an elastomeric coating.

19. The filter insert claimed in claim 16, wherein the two sealing contours each have a different hardness than the other.

20. The filter insert as claimed in claim 16, wherein the two sealing contours are at least one of (i) integrally molded onto the associated end disc and (ii) injection molded onto the associated end disc.

21. The filter insert as claimed in claim 16, wherein a seal separating an unfiltered side and a filtered side of the liquid filter from one another in the installed state of the filter insert is disposed on the same end disc of the filter insert as the sealing contours of the filter bypass valve.

22. The filter insert as claimed in claim 21, wherein the seal between the unfiltered side and the filtered side is combined with at least one of the sealing contours to produce a sealing ring.

23. The filter insert as claimed in claim 16, wherein on the end disc having the valve seat the filter insert has an axially and obliquely radially outwardly extending flange, of which the axially outwardly directed side forms the valve seat with the two sealing contours, and wherein the at least one bypass channel extends through the flange between the sealing contours.

24. The filter insert as claimed in claim 23, wherein the flange is one of (i) constructed integrally with the associated end disc and (ii) manufactured as a separate component and connected, by one of welding, bonding, clipping and latching, to the associated end disc.

25. The filter insert as claimed in claim 24, wherein the flange manufactured as a separate component comprises a supporting grid for the filter material element of the filter insert.

26. The filter insert as claimed in claim 16, wherein on the filter insert unlatching means are provided, by means of which with the filter insert installed in an associated liquid filter a latching device can be unlatched, by which a valve body which simultaneously forms a locking element of a mounting lock against the installation of unauthorized filter inserts is locked against axial displacement.

27. The filter insert as claimed in claim 26, wherein the unlatching means are formed by one or more radially inwardly directed lugs which are disposed on an internal periphery of a central aperture in one of the end discs.

28. The filter insert as claimed in claim 26, wherein the two sealing contours and the unlatching means are all provided on one of the two end discs of the filter insert.

29. A liquid filter comprising:
a housing having a removable cover,
an inlet for liquid to be filtered which opens into an unfiltered side of the liquid filter,
an outlet for filtered liquid which starts from a filtered side of the liquid filter,
a replaceable filter insert which separates the unfiltered side and the filtered side from one another and which comprises a hollow cylindrical filter material element having a central axis and enclosed at the end faces by two end discs,
a filter bypass valve, comprising a valve seat arranged on the filter insert and a valve body which interacts with the valve seat and is acted upon by a preload force in the closing direction,
two closed sealing contours arranged one inside the other as viewed in the radial direction provided between the valve seat and the valve body,
at least one bypass channel, which connects the unfiltered side and the filtered side of the liquid filter while bypassing the filter material element, passing through the valve seat between the sealing contours,
the valve body being movably guided in the filter housing on a filter housing part,
the valve body simultaneously forming a locking element of a mounting lock against the installation of unauthorized filter inserts, and a latching device locking the valve body against an axial movement and which during installation of a filter insert can be unlatched only by matching unlatching means on an associated filter insert.

30. The liquid filter as claimed in claim 29, wherein the valve body is movably guided in the filter housing on a filter housing part, wherein the two sealing contours are offset from one another in the axial direction, and wherein the valve body has a shape in a sealing area of the valve body which interacts with the sealing contours that is one of conical, tapered and dome-like.

* * * * *